(12) United States Patent
Moisan

(10) Patent No.: US 12,709,300 B2
(45) Date of Patent: Aug. 18, 2026

(54) METHOD, APPARATUS, AND SYSTEM FOR PROVIDING A RUNAWAY VEHICLE DETECTION SYSTEM

(71) Applicant: HERE Global B.V., Eindhoven (NL)

(72) Inventor: Jeffrey Moisan, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 583 days.

(21) Appl. No.: 17/939,699

(22) Filed: Sep. 7, 2022

(65) Prior Publication Data

US 2024/0075957 A1 Mar. 7, 2024

(51) Int. Cl.
*B60W 60/00* (2020.01)
*B60W 50/14* (2020.01)

(52) U.S. Cl.
CPC ........ *B60W 60/0016* (2020.02); *B60W 50/14* (2013.01); *B60W 2050/146* (2013.01); *B60W 2554/4041* (2020.02)

(58) Field of Classification Search
CPC ................................................ B60W 60/0016
See application file for complete search history.

(56) References Cited

U.S. PATENT DOCUMENTS 8,504,271 B2 8/2013 Seymour et al.
10,748,419 B1 * 8/2020 Fields .................... G08G 1/166
11,710,188 B2 * 7/2023 Konrardy ............... G06Q 40/08 705/4
11,719,545 B2 * 8/2023 Konrardy .......... B60W 30/0956 701/23
11,770,701 B2 * 9/2023 Koniaris ............... H04W 12/04
11,772,669 B2 * 10/2023 Ravichandran ....... B60W 50/10 701/24
11,861,754 B2 * 1/2024 Kang ..................... G06Q 50/40
11,875,686 B2 * 1/2024 Twitty .................. H04W 4/027
(Continued)

FOREIGN PATENT DOCUMENTS

CN 111127884 A 5/2020
CN 111204278 B 5/2020
FR 2598128 A1 11/1987

OTHER PUBLICATIONS

Encore Protection, "How to use a runaway truck ramp properly", Oct. 27, 2020, 7 pages.
(Continued)

*Primary Examiner* — Jean Paul Cass
(74) *Attorney, Agent, or Firm* — DITTHAVONG, STEINER & MLOTKOWSKI

(57) ABSTRACT

An approach is provided for a runaway vehicle detection system. The approach, for example, involves processing sensor data to detect that a vehicle is involved in or predicted to be involved in a runaway vehicle event. The approach also involves processing map data, the sensor data, or a combination thereof to determine a runaway vehicle safety location based on at least one attribute of the vehicle. The approach further involves generating an alert message indicating the runaway vehicle safety location. The approach further involves providing the alert message for display on a device associated with the vehicle. In one embodiment, the approach further involves mapping the runaway vehicle safety location, the runaway vehicle event, or a combination thereof to digital map of a geographic database.

20 Claims, 20 Drawing Sheets

(56) References Cited

U.S. PATENT DOCUMENTS

| | | | | |
|---|---|---|---|---|
| 2015/0153733 | A1* | 6/2015 | Ohmura | G05D 1/0295 701/23 |
| 2019/0258251 | A1* | 8/2019 | Ditty | G05D 1/0274 |
| 2022/0097676 | A1* | 3/2022 | Gesang | B60W 20/14 |
| 2022/0122001 | A1* | 4/2022 | Choe | G06N 20/20 |
| 2022/0348227 | A1* | 11/2022 | Foster | B60Q 1/507 |
| 2024/0075957 | A1* | 3/2024 | Moisan | B60W 50/14 |
| 2024/0127632 | A1* | 4/2024 | Mckearin | G06Q 30/01 |

OTHER PUBLICATIONS

Apronti et al., abstract of "Truck safety evaluation on wyoming mountain passes", Accident Analysis & Prevention, vol. 122, Jan. 2019, pp. 342-349.

* cited by examiner

100
USER EQUIPMENT (UE) DEVICE 111
APPLICATION 109
SENSORS 117
101a
119
103
101b
101c
105
RUNAWAY VEHICLE EVENT DATA 123
SENSOR DATA 115 (E.G., IMAGES, SOUND)
MAPPING PLATFORM 107
MACHINE LEARNING SYSTEM 121
RUNAWAY VEHICLE SAFETY LOCATION DATA 131
COMMUNICATION NETWORK 133
SERVICES PLATFORM 135
SERVICE 125a
SERVICE 125n
MACHINE LEARNING MODEL 129
GEOGRAPHIC DATABASE 113 (E.G., MAP DATA)
CONTENT PROVIDER 127a
CONTENT PROVIDER 127m 401a
401b
401c
401d
SENSOR DATA
115
MACHINE
LEARNING
SYSTEM 121
VEHICLE
ATTRIBUTE DATA
403

1700

MOBILE TERMINAL
1801
1817
1835
1821
Duplexer
1837
LNA
1833
1819
PA
1839
Down-
Converter
Synthesizer
Up-
Converter
1831
Battery Interface
&
Power Control
1820
1841
Demodulator
RF
Interface
Modulator
1827
1829
1815
1825
Equalizer
1847
Keyboard
1807
Display
1849
SIM Card
1805
DSP
MCU
1803
ASIC BACKPLANE
1843
AUDIO
INTERFACE
CODEC
DAC
ADC
1845
1811
1813
1823
1809
MEMORY
1851

METHOD, APPARATUS, AND SYSTEM FOR PROVIDING A RUNAWAY VEHICLE DETECTION SYSTEM

BACKGROUND

Providing environmental awareness for vehicle safety, particularly in autonomous driving, has been a primary concern for automobile manufacturers and related service providers. For example, one condition that can affect safety is the occurrence of runaway vehicles that have lost the ability to control their speed fully or partially in a road network. Accordingly, having data on when and where such runaway vehicles occur and how to mitigate their safety risks presents significant technical challenges for service providers.

SOME EXAMPLE EMBODIMENTS

Therefore, there is a need for providing a runaway vehicle detection system.

According to one embodiment, a computer-implemented method comprises processing sensor data to detect that a vehicle is involved in or predicted to be involved in a runaway vehicle event. The method also comprises processing map data, the sensor data, or a combination thereof to determine a runaway vehicle safety location based on at least one attribute of the vehicle. The method further comprises generating an alert message indicating the runaway vehicle safety location. The method further comprises providing the alert message for display on a device associated with the vehicle. In some embodiments, the method further comprises mapping the runaway vehicle safety location, the runaway vehicle event, or a combination thereof to digital map of a geographic database.

According to another embodiment, an apparatus comprises at least one processor, and at least one memory including computer program code for one or more computer programs, the at least one memory and the computer program code configured to, with the at least one processor, cause, at least in part, the apparatus to process sensor data to detect that a vehicle is involved in or predicted to be involved in a runaway vehicle event. The apparatus is also caused to process map data, the sensor data, or a combination thereof to determine a runaway vehicle safety location based on at least one attribute of the vehicle. The apparatus is further caused to generate an alert message indicating the runaway vehicle safety location. The apparatus is further caused to provide the alert message for display on a device associated with the vehicle. In some embodiments, the apparatus is further caused to map the runaway vehicle safety location, the runaway vehicle event, or a combination thereof to digital map of a geographic database.

According to another embodiment, a non-transitory computer-readable storage medium for determining a navigation route based on vulnerable road user data carries one or more sequences of one or more instructions which, when executed by one or more processors, cause, at least in part, an apparatus to process sensor data to detect that a vehicle is involved in or predicted to be involved in a runaway vehicle event. The apparatus is also caused to process map data, the sensor data, or a combination thereof to determine a runaway vehicle safety location based on at least one attribute of the vehicle. The apparatus is further caused to generate an alert message indicating the runaway vehicle safety location. The apparatus is further caused to provide the alert message for display on a device associated with the vehicle. In some embodiments, the apparatus is further caused to map the runaway vehicle safety location, the runaway vehicle event, or a combination thereof to digital map of a geographic database.

According to another embodiment, an apparatus comprises means for processing sensor data to detect that a vehicle is involved in or predicted to be involved in a runaway vehicle event. The apparatus also comprises means for processing map data, the sensor data, or a combination thereof to determine a runaway vehicle safety location based on at least one attribute of the vehicle. The apparatus further comprises means for generating an alert message indicating the runaway vehicle safety location. The apparatus further comprises means for providing the alert message for display on a device associated with the vehicle. In some embodiments, the apparatus further comprises means for mapping the runaway vehicle safety location, the runaway vehicle event, or a combination thereof to digital map of a geographic database.

In addition, for various example embodiments described herein, the following is applicable: a computer program product may be provided. For example, a computer program product comprising instructions which, when the program is executed by a computer, cause the computer to perform any one or any combination of methods (or processes) disclosed.

For various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a runaway vehicle detection system are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such, "one embodiment" can also be used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Figure 1:
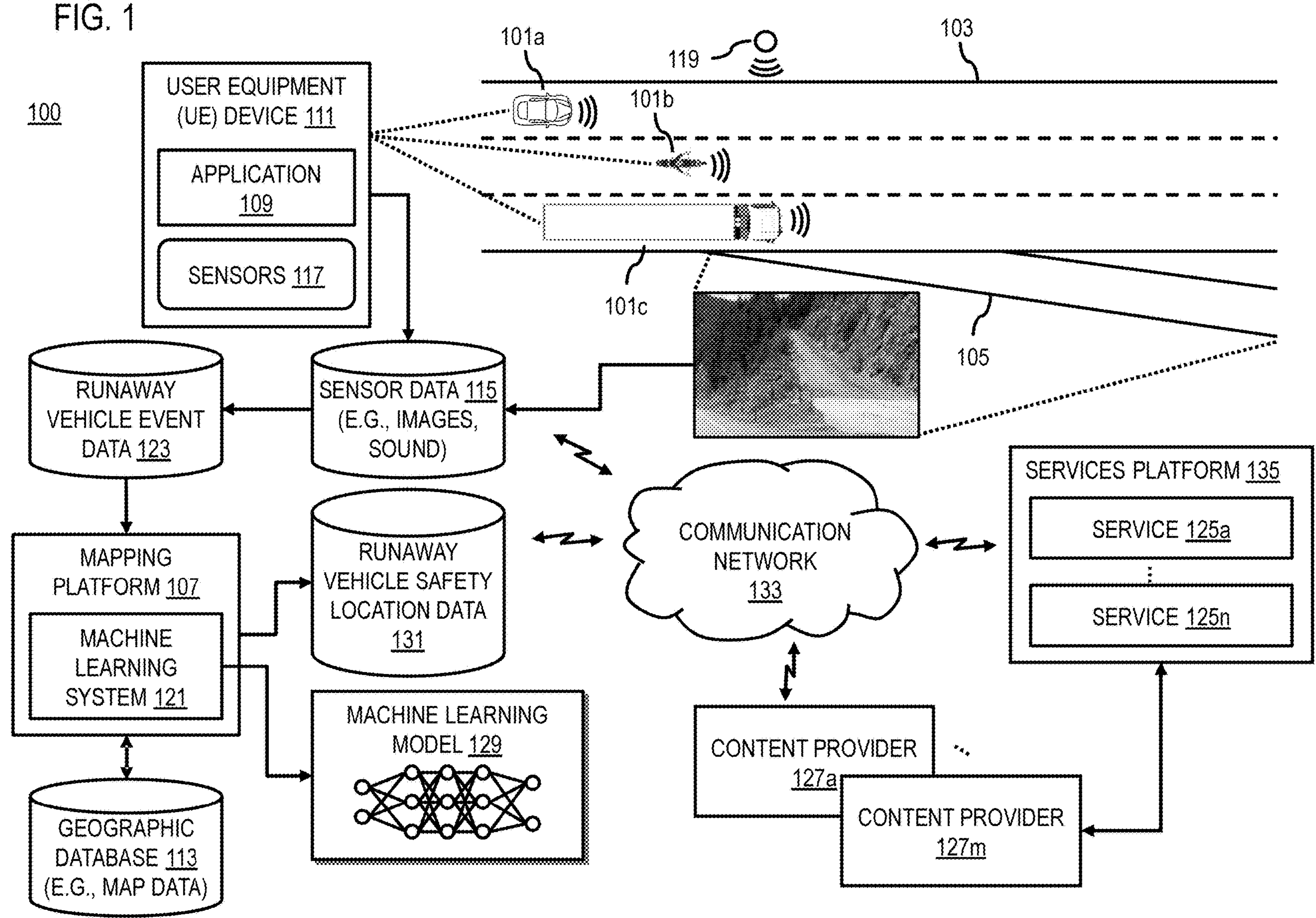
FIG. 1 is a diagram of a system capable of providing a runaway vehicle detection system, according to one example embodiment.

FIG. 1 is a diagram of a system 100 capable of providing a runaway vehicle detection system, according to one example embodiment. As used herein, the term "runaway vehicle" refers to a vehicle (e.g., of any type such as but not limited to a car 101*a*, motorcycle 101*b*, or truck 101*c*—collectively referred to herein as vehicles 101) that has lost its ability to fully or partially control its speed when operating on a road 103. This loss of speed control can arise from any number of factors including but not limited to mechanical failure (e.g., brake failure, stuck accelerator, etc.) or road terrain (e.g., mountains, steep inclines/declines, etc.). The occurrence of a runaway vehicle 101 on road 103 or any other drivable surface can then be referred as a "runaway vehicle event."

When a runaway vehicle event occurs (e.g., when a vehicle 101's brakes fail when traveling downhill), it poses a serious risk to those in proximity to the vehicle 101. For example, in many mountainous areas the use of runaway truck ramps (e.g., runaway ramp 105) is common because the brakes on trucks can fail applied continuously during long descents down a mountain. However, these ramps are not always present and, even when present, there is a need for a system to aid drivers when such an emergency (e.g., brake failure, stuck accelerator, etc. resulting in a runaway vehicle event) occurs.

To address these technical challenges, the system 100 introduces a capability (e.g., via a mapping platform 107 alone or in combination with a client application 109 executing on a user equipment (UE) device 111) to detect runaway vehicle events and to provide technical solutions to vehicles 101 and their drivers/passengers to address the events. In various embodiments, the system 100 provides one or more of the technical functions in response to or in preparation for runaway vehicle events (described in the enumerated paragraphs below).

(1) The system 100 uses map data (e.g., map data of a geographic database 113) and/or image data (or any other type of sensor data 115) to map runaway vehicle safety locations (e.g., runaway vehicle safety location data 131) where a runaway vehicle 101 can be directed to slow down as safely as possible while also minimizing risks to other vehicles or road users. In one embodiment, in addition or as an alternate to image data, the sensor data 115 can include sound data, LiDAR data, radar data, etc. collected from one or more sensors These runaway vehicle safety locations include both dedicated locations as well as ad-hoc locations. As described above, one example of a dedicated runaway vehicle safety location is runaway safety ramp found in mountainous area. The term "ad-hoc runaway vehicle safety location" refers to a location that is not a specially configured dedicated runaway vehicle safety location but nonetheless has topographical or other properties that make the location suitable for safely slowing down a runaway vehicle 101. Examples of ad-hoc runaway vehicle safety locations include but are not limited to as open fields, large shoulders, lakes, etc. that are generally free of structures or people that may be at risk from the runaway vehicle 101. In one embodiment, the system 101 searches the map data (e.g., the geographic database 113) and/or sensor data 115 for the topographical features or properties associated with areas suitable to act as ad-hoc runaway vehicle safety locations.

(2) In one embodiment, the system 100 monitors for runaway vehicles 101 via sensor data 115. For example, the sensor data 115 can be collected from one or more sensors 117 associated devices in the monitored area including but not limited to the UE 111, runaway vehicle 101, other vehicles 101 passing by in the area, infrastructure devices 119 (e.g., traffic cameras, embedded road sensors, etc.). As previously described, the sensor data can include image data, sound data (e.g., capturing the sound brakes wearing out, out of control vehicles 101, etc.), and/or any other sensor type. In one embodiment, a machine learning model (e.g., as part of a machine learning system 121, mapping platform 107, application 109, etc.) may also examine past and current runaway vehicle events (e.g., runaway vehicle event data 123) to predict such events and where they may occur.

(3) In one embodiment, when a runaway vehicle 101 is detected or otherwise predicted, the system 100 alerts other vehicles 101 in the area to take evasive action and/or activates automated driving controls for evasive action by the runaway vehicle 101.

(4) In one embodiment, the system 100 identifies the closest suitable runaway safety location (e.g., dedicated and/or ad-hoc location such as but not limited to safety ramps 105, open fields, shoulders, etc.) based on attributes (e.g., vehicle speed, size, weight, cargo, etc.) of the runaway vehicle 101.

(5) In one embodiment, the system 100 displays information about detected or predicted runaway vehicle event to the driver of the runaway vehicle 101 in the form of alerts and/or navigation route guidance. In addition or alternatively, the system 100 can initiate the runaway vehicle 101 to take automated driving actions in response (e.g., if the runaway vehicle 101 is configured with autonomous driving control).

(6) In one embodiment, the system 100 can use machine learning (e.g., via machine learning system 121) to look at similarly situated areas to identify runaway vehicle safety locations (e.g., safety ramps, open fields, etc.) in the other areas which are suitable for use in runaway vehicle situations. For example, the machine learning system 121 can train a machine learning model (e.g., a neural network or equivalent) using training examples of geographic areas or map data topologies that have been labeled as runaway vehicle safety locations as ground truth. In this way, the trained machine learning models will learn the topographical, geographical, map, etc. features that will lead to a predicted runaway vehicle safety location.

(7) In one embodiment, the system 100 provide navigation route guidance with information on the best or safest routes which avoid known and/or potential runaway risk areas.

(8) In one embodiment, the system 100 may also account for nearby points of interest (POIs), places, etc. In this way, if, for example, a school is nearby the closest runaway vehicle safety location, the system 100 may choose a different runaway vehicle safety location (e.g., a ramp, field, etc.) in a more isolated area to safely steer the runaway vehicle 101 off the road.

(9) In one embodiment, the system 100 may also consider contextual information (e.g., real-time and/or historical contextual information) when selecting or recommending a runaway vehicle safety location. For example, the system 100 may also determine routes with less traffic to send a runaway vehicle 101 to avoid collateral damage. In another example, the system 100 may also determine that weather conditions (e.g., rain) have provided more available runaway vehicle safety locations. For example, after a rainstorm, a muddy field might "catch" a runaway vehicle 101 better than a paved parking lot or shoulder. In another example, a ditch or culvert filled with rainwater next to a roadway might also provide better or worse outcomes for a runaway vehicle event so the system 100 could also examine trends for identifying suitable runaway vehicle safety locations that be related to different weather patterns and/or any other contextual parameter.

The following provides an example of how the system 100 can be used for runaway vehicle event detection. In this example, a truck 101*c* is hauling dangerous chemicals in the mountains. The system 100 may identify the truck 101*c* via the vehicle camera systems (e.g., sensors 117) of passing vehicles (e.g., car 101*a*, motorcycle 101*b*), infrastructure devices (e.g., traffic camera 119), and/or any other device with a view of the road 103 on which the truck 101*c* is driving. For example, the system 100 may analyze the images (or any other type of sensor data 115) of the truck 101*c* to identify its size, weight, speed, etc. (e.g., using machine learning-based computer vision, object detection, image segmentation, etc.).

In one embodiment, the system 100 may also process image data to identify the truck 101*c*'s placards to determine if it is carrying any dangerous cargo (e.g., flammable liquid, noxious gas, etc.). The system 100 may also monitor the truck 101*c* and determine if its brakes are in good working condition or not (e.g., look for brake slippage in the sensor data 115). In this example, based on the truck 101*c*'s location going up a mountain, the system 100 may assign a heightened runaway vehicle risk factor to the truck 101*c* as it approaches the downhill portion of a given mountain roadway. This heighten runaway vehicle risk factor can be based on the information above concerning the truck 101*c*'s size, speed, cargo, etc. and also take into account the danger a given roadway poses (e.g., as determined from the map data of the geographic database 113). Some mountain roads are steeper, longer, or generally more dangerous (for any number of reasons), and this data may be obtained by the system 100 based off historical data records and/or predicted by a machine learning model (e.g., of a machine learning system 121) that looks at various common factors which can cause a runaway to occur. If the determined risk factor for the truck information plus roadway information exceed an acceptable threshold the system 100 may generate alerts, take automated driving actions, etc. to mitigate the risk.

Continuing with this example, if the runaway vehicle event actually occurs, the system 100 may then also detect the runaway vehicle event via image data (or any other type of sensor data 115) and act upon it to send further warnings, update route guidance for the truck 101*c* and other vehicles 101 on the roadway (e.g., road 103), and also take automated actions to mitigate the risk.

For example, if a given vehicle 101 suffers a runaway vehicle event, the system may identify the closest suitable runaway vehicle safety ramp and guide the runaway vehicle to the ramp. The suitable ramp may take into account nearby POIs, etc. so, in this example, if a safety ramp is near a town or homes and there is a more secluded ramp down the mountain the system may opt to direct the runaway truck to the safer ramp due to dangerous cargo.

It is noted that the example of a truck 101*c* as a runaway vehicle 101 is provided by way of illustration and not as a limitation. It is contemplated the runaway vehicle 101 can be any other type of vehicle including but not limited to cars 101*a*, motorcycles 101*b*, etc. In one embodiment, the different runaway vehicle safety locations are available to different vehicle types because they have different attributes (e.g., speed, size, weight, cargo, etc.).

In some cases, there may be no runaway ramp 105 available, if for example, there is a car 101*a* with a stuck accelerator on a highway. In this case, the system 100 can detect such a runaway vehicle event as described above and instead of a safety ramp 105, they system can look at areas proximate to the car 101*a* which would allow of the user to steer from the roadway and come to a stop in an ad-hoc runaway vehicle safety location (e.g., open field, large shoulder, etc.). In one embodiment, such actions could also be automated in an emergency. For example, if a driver suffers a health issue and falls unconscious with their foot on the gas, their vehicle's automated controls could steer them off the roadway quickly into an open field or shoulder (e.g., or any other runaway vehicle safety location) and bring the vehicle to a stop as safely as possible.

In one embodiment, the mapping platform 107 performs the functions associated with providing a runaway vehicle detection system according to the embodiments described herein. The mapping platform 107 may have connectivity over a communication network 133 to services and applications (e.g., a services platform 135 comprising one or more services 125*a*-125*n*, collectively referred to as services 125, such as location-based services) and/or content providers 127*a*-127*m* (also collectively referred to as content providers 127) that can use the output of the system 100 (e.g., runaway vehicle event data 123 and/or runaway vehicle safety location data 131) or provide data (e.g., images, maps, traffic, weather, etc.) used by the mapping platform 107 to generate the runaway vehicle event data 123 and/or runaway vehicle safety location data 131.

Figure 2:
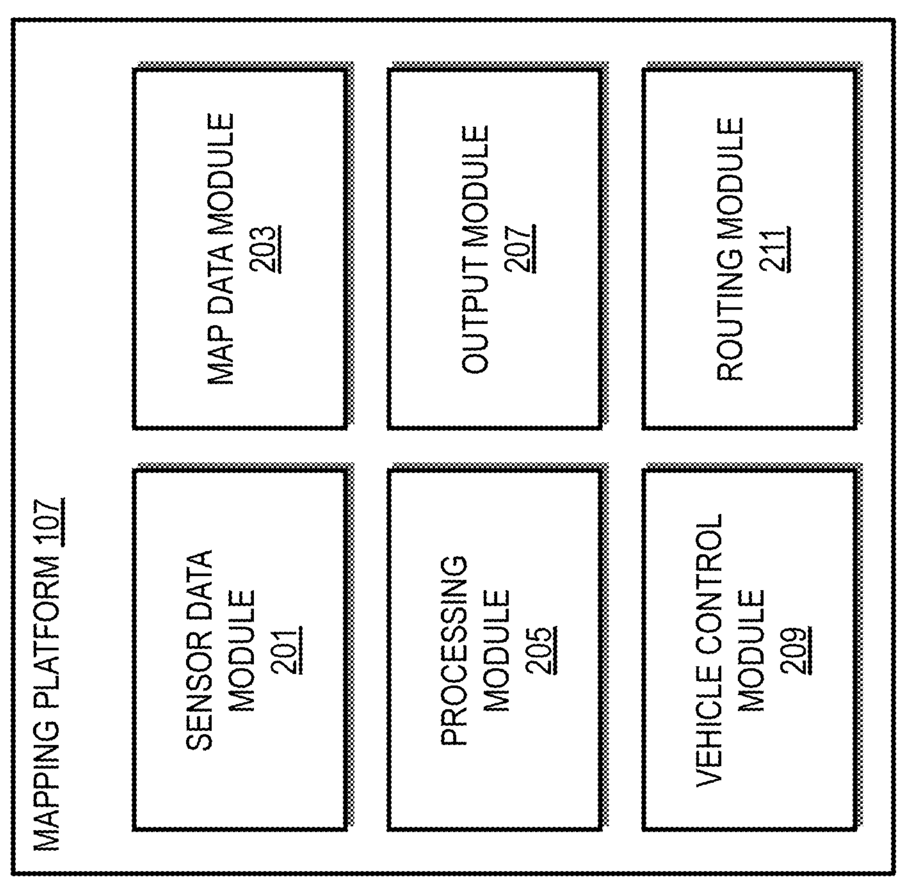
FIG. 2 is a diagram of the components of a mapping platform capable of providing a runaway vehicle detection system, according to one example embodiment.

FIG. 2 is a diagram of the components of the mapping platform 107, according to one example embodiment. In one embodiment, the application 109 of the vehicle 101 can perform all or a portion of the runaway vehicle functions of the mapping platform 107 alone or more in combination with the mapping platform 107. It is contemplated that the functions of these components may be combined or performed by other components of equivalent functionality. In one embodiment, the mapping platform 107 and/or application 109 include a sensor data module 201, a map data module 203, a processing module 205, an output module 207, a vehicle control module 209, and a routing module 211. In one embodiment, the mapping platform 107 also includes or otherwise has access to a machine learning system 121 and associated machine learning model 129 (e.g., trained to detect or predict runaway vehicle events, runaway vehicle safety locations, and/or any other machine learning-based tasks discussed with respect to the various embodiments described herein). The above presented modules and components of the mapping platform 107 and/or application 109 can be implemented in hardware, firmware, software, circuitry, or a combination thereof. Though depicted as separate entities in FIG. 1, it is contemplated that the mapping platform 107 and/or application 109 may be implemented as a module of any of the components of the system 100 (e.g., a component of the vehicles 101, UEs 111, services platform 135, services 125, etc.). In another embodiment, one or more of the modules 201-211 may be implemented as a cloud-based service, local service, native application, or combination thereof. The functions of the mapping platform 107, application 109, and modules 201-211 are discussed with respect to the figures below.

Figure 3:
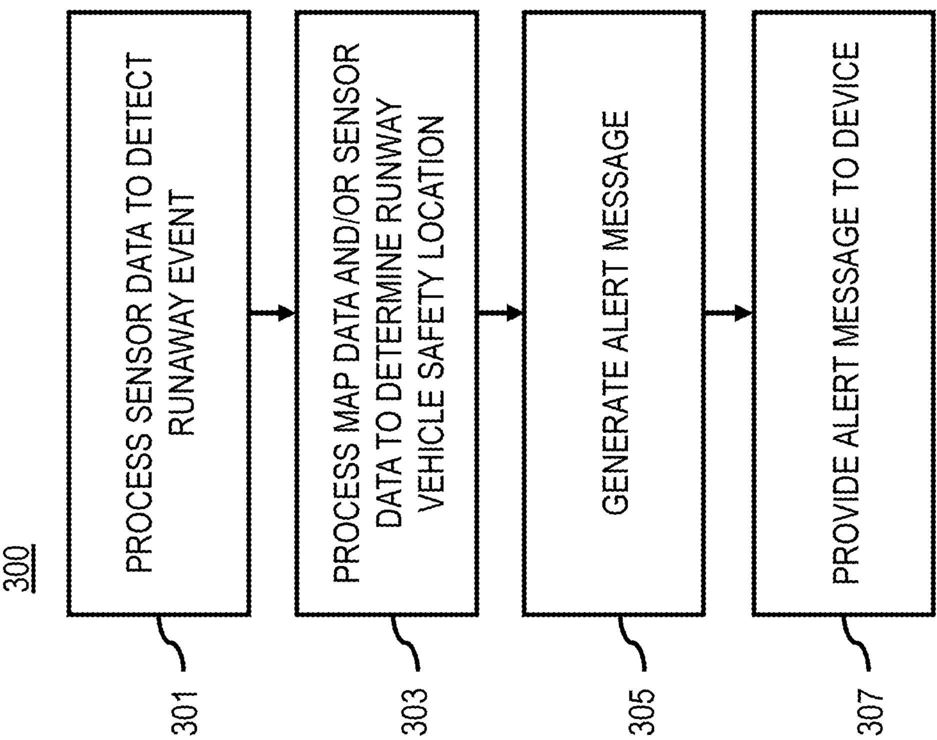
FIG. 3 is a flowchart of a process for providing a runaway vehicle detection system, according to one example embodiment.
Figure 17:
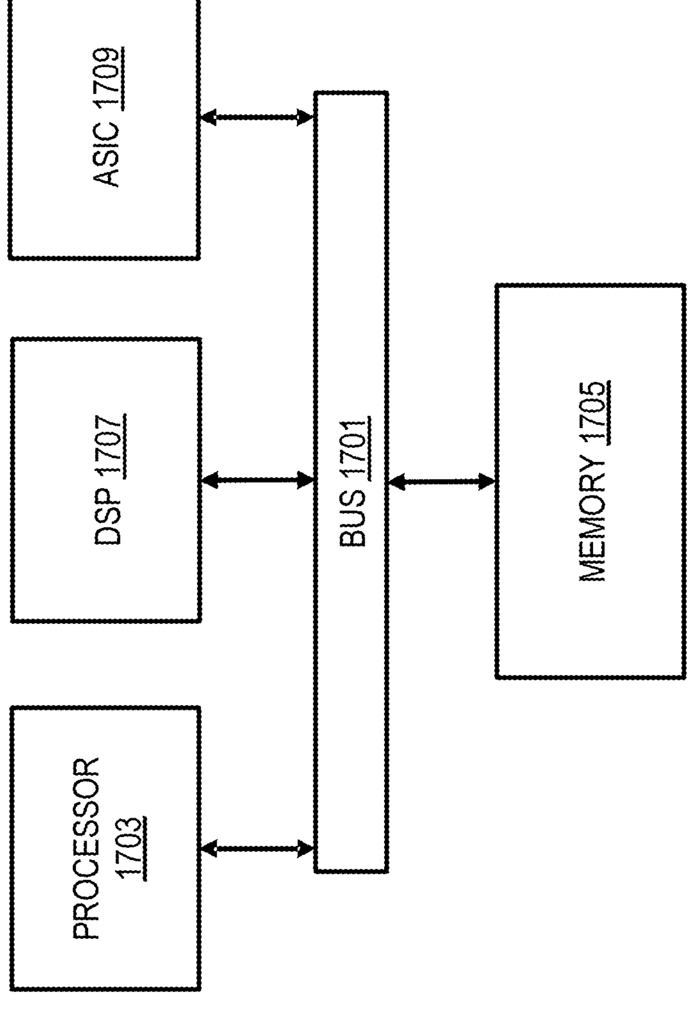
FIG. 17 is a diagram of a chip set that can be used to implement an embodiment.

FIG. 3 is a flowchart of a process 300 for providing a runaway vehicle detection system, according to one example embodiment. In various embodiments, the mapping platform 107, application 109, and/or any of the modules 201-211 may perform one or more portions of the process 300 and may be implemented in, for instance, a chip set including a processor and a memory as shown in FIG. 17 and/or other circuitry for performing one or more steps of the process 300. As such, mapping platform 107, application 109, and/or any of the modules 201-211 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In step 301, the sensor data module 201 processes sensor data 115 to detect that a vehicle 101 is involved in or predicted to be involved in a runaway vehicle event. By way of example, the sensor data can include image data, sound data, or a combination thereof collected by one or more sensors of the vehicle, a passing vehicle, an infrastructure device, an aerial vehicle, or combination thereof. The sensor data module 201, for instance, can use a feature detector to process the sensor data 115 to identify features that can be used to detect a runaway vehicle event. For example, if the sensor data 115 includes sound, the sound data can be analyzed to determine whether they match sound samples corresponding to a runaway vehicle event (e.g., the sound of a brake wearing down, engine revving from a stuck accelerator, tire noise associated with a runaway vehicle event, etc.). Similarly, if the sensor data 115 includes images, the image data can be processed to determined visual features that can be used to detect a runaway vehicle event (e.g., presence of a decline or downhill position of the vehicle 101, motion blur from wheels spinning at excessive speeds, etc.). In yet another example, the sensor data 115 can include data registered by the vehicle 101's electronic control unit (ECU). These sensor readings, generally, are of a self-diagnostic, self-monitoring nature in comparison to the sound, camera, LiDAR, etc. sensors described in the various embodiments above. In one embodiment, the self-diagnostic/monitoring data sensor data can be accessed over the vehicle 101's controller area network (CAN) bus or equivalent. Then, the data can be processed, for instance, to detect discrepancies between driver/control inputs and brake/drivetrain sensor values and/or to determine other system issues/failures that indicate a runaway vehicle event.

In one embodiment, the runaway vehicle event can be detected or predicted using machine learning. For example, features of a vehicle 101 and/or its surroundings can be extracted from the sensor data 115. Then, a trained machine learning model 129 can be used to predict whether the features results in classifying that the vehicle 101 is experiencing a runaway vehicle event. In another embodiment, the machine learning model 129 can be trained to preemptively predict whether a vehicle 101 will be experiencing a runaway vehicle event before the event occurs. In this case, the extracted features related to characteristics of the vehicle 101 and/or its surroundings that would lead to a predicted runaway vehicle event (e.g., a vehicle 101 that is about to encounter a downhill roach section with a decline angle and/or length above a threshold value).

In one embodiment, the machine learning model 129 can be trained using a training data set comprising examples of different feature sets that have been labeled with ground truth runaway vehicle events or non-events with respect. The labels can also indicate whether the ground truth applies to a runaway vehicle detection scenario or a prediction scenario (e.g., depending on whether the machine learning model 129 is being trained to detect and/or predict a runaway vehicle event). This labeled data is used as the ground truth data for training. Multiple different loss functions and/or supervision schemes can be used alternatively or together to train the machine learning model 129. One example scheme is based on supervised learning. For example, in supervised learning, the machine learning system 121 can incorporate a learning model (e.g., a logistic regression model, Random Forest model, and/or any equivalent model) to train the machine learning model 129 to make predictions from input features.

During training, the machine learning system 121 can feed feature sets from the training data set into the machine learning model 129 to compute a runaway vehicle event detection and/or prediction using an initial set of model parameters. The machine learning system 121 then compares the predicted matching probability and runaway vehicle event detection/prediction to the ground truth data in the training data set for each training example used for training. The machine learning system 121 then computes an accuracy of the predictions (e.g., via a loss function) for the initial set of model parameters. If the accuracy or level of performance does not meet a threshold or configured level, the system 100 incrementally adjusts the model parameters until the machine learning model generates predictions at a desired or configured level of accuracy with respect to the annotated labels in the training data (e.g., the ground truth data). In other words, a "trained" machine learning model has model parameters adjusted to make accurate predictions with respect to the training data set. In the case of a neural network, the model paraments can include, but are not limited, to the coefficients or weights and biases assigned to each connection between neurons in the layers of the neural network.

In one embodiment, the machine learning model 129 or feature detector can be trained or otherwise configured to classify or predict one or more attributes of the vehicle from the sensor data 115. By way of example, the one or more attributes include but are not limited to a vehicle type, a vehicle speed, a vehicle size, a vehicle weight, a vehicle cargo, or a combination thereof. In one embodiment, the prediction of the vehicle attribute can also be performed using machine learning based on a machine learning model 129 trained as described in the various embodiments above.

Figure 4:
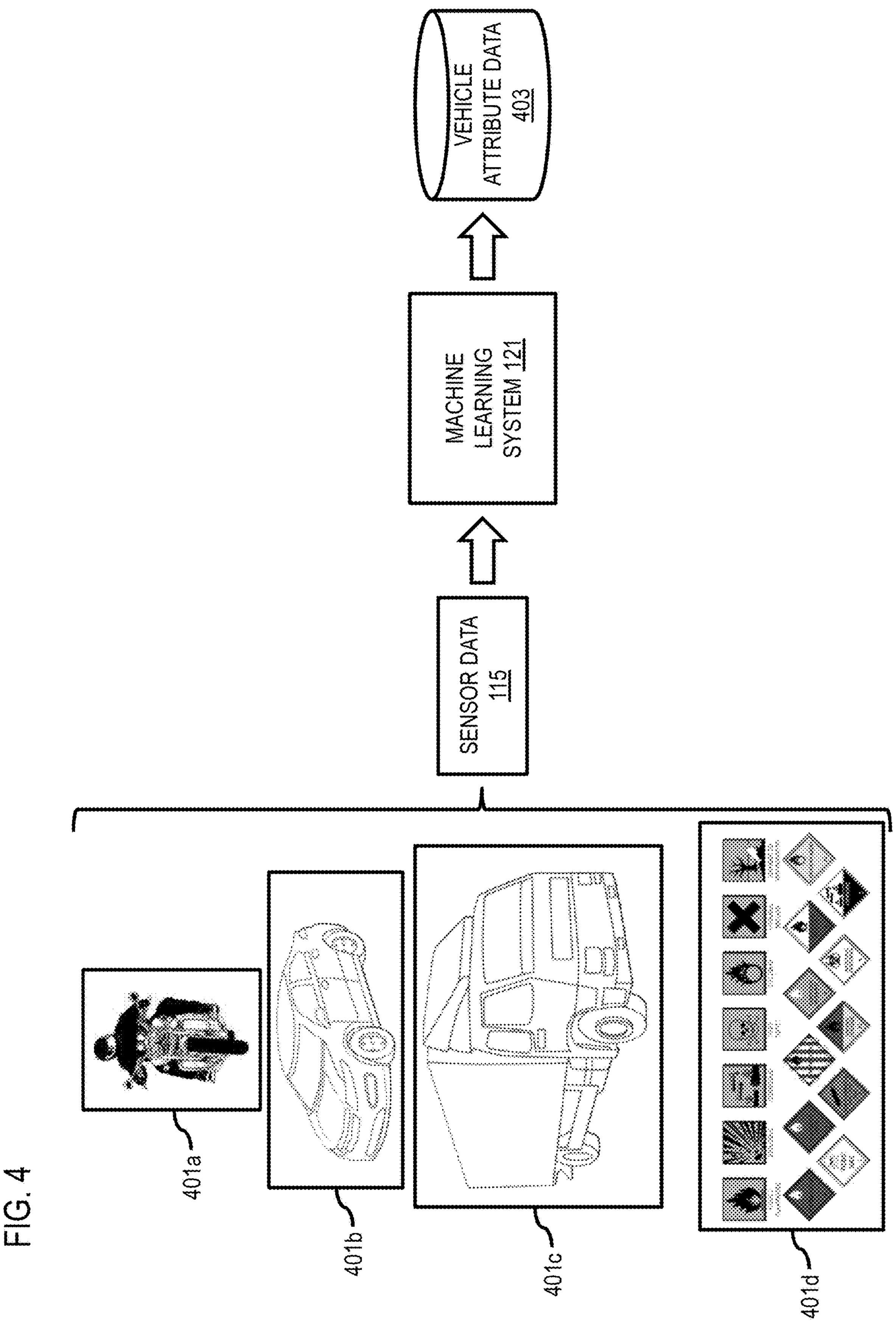
FIG. 4 is a diagram illustrating examples of extracting attributes of a runaway vehicle from sensor data, according to one example embodiment.

FIG. 4 is a diagram illustrating examples of extracting attributes of a runaway vehicle 101 from sensor data 115, according to one example embodiment. In the example of FIG. 4, the sensor data 115 includes an image 401*a* depicting a runaway motorcycle 101*b*, image 401*b* depicting a runaway car 101*a*, image 401*c* depicting a runaway truck 101*c*, and image 401*d* of hazardous materials placards indicating warnings of the cargo of any of the vehicles in the images 401*a*-401*c*. In one embodiment, the sensor data 115 (e.g., images 401*a*-401*d*) are processed by the machine learning system 121 using a trained machine learning model 129 to predict vehicle attribute data 403 for each vehicle 101 depicted in the respective images 401*a*-401*c*.

In step 303, the map data module 203 (e.g., alone or in combination with the sensor data module 201) processes map data (e.g., geographic database 113), the sensor data 115, or a combination thereof to determine a runaway vehicle safety location based on at least one attribute of the vehicle. In one embodiment, the map data module 203 queries the geographic database 113 for areas (e.g., within threshold proximity of a runaway vehicle event) that have topographical features or properties that can support slowing down the runaway vehicle 101 to a stop. The map data module 203 can use attributes of the vehicle (e.g., type, speed, size, weight, etc.) to estimate the distance needed to stop the vehicle. This distance can then be compared against candidate runaway vehicle safety locations to determine a recommended location. For example, if the vehicle attributes indicate that the runaway vehicle 101 is a lightweight motorcycle 101*a*, then runaway vehicle safety locations of lesser size or extent (e.g., smaller field, shorter shoulder distance, etc.) can be selected versus a vehicle attributes of truck 101*c* which would need longer or more expansive locations.

In one embodiment, the attributes include the type of cargo being carried by a runaway vehicle 101. For example, the cargo can be determined based on placards or other signs/markings on the vehicle 101. In addition or alternatively, the cargo can be determined based the size and/or shape of vehicle 101 (e.g., truck shape), associated cargo containers, objects/items carried on the truck, and/or the like. For example, the sensor data 115 (e.g., image data) can be processed using computer vision (e.g., image segmentation) to determine the shape of the truck, and the determined shaped can be matched against known shapes of vehicles associated with different types of cargo (e.g., fuel trucks, flatbed trailers with exposed cargo, etc.). In another example, the cargo can be determined based a travel history or itinerary data of the vehicle 101 (e.g., probe or trajectory data collected by the vehicle 101, travel log data, etc.) indicating visits to departure, waypoint, and/or destination locations associated with different types of potentially hazardous cargo such as but not limited to fuel depots, chemical plants, hazardous waste disposal facilities, etc. The runaway vehicle safety location can then be selected based on the cargo. Runaway vehicles 101 that are carrying, for instance, hazardous cargo can be directed to runaway vehicle safety locations that would mitigate environmental impacts should the cargo spill (e.g., select a runaway vehicle safety location that is not near drinking water sources or environmentally sensitive areas, select an open area with a rock foundation rather than bare earth, select a field versus a shallow lake, etc.).

In summary, in one embodiment, the runaway vehicle safety location includes a dedicated runaway vehicle safety location, an ad-hoc runaway vehicle safety location, or a combination thereof. The map data module 203 then searches map data (e.g., geographic database 113), sensor data 115, or a combination thereof for one or more candidate locations with one or more topographical features capable of slowing the vehicle. Search sensor data 115, for instance, comprise using a feature detector to identify any suitable runaway vehicle safety locations (e.g., ramps, fields, etc.) depicted in image data. Metadata associated with image data can be used to determine the location coordinates of the runaway vehicle safety locations. In one embodiment, the map data module 203 then selects the runaway vehicle safety location from the one or more candidate locations based on minimizing damage to the vehicle, the vehicle runaway vehicle safety location, a passenger of the vehicle, or a combination thereof.

Figure 5A:
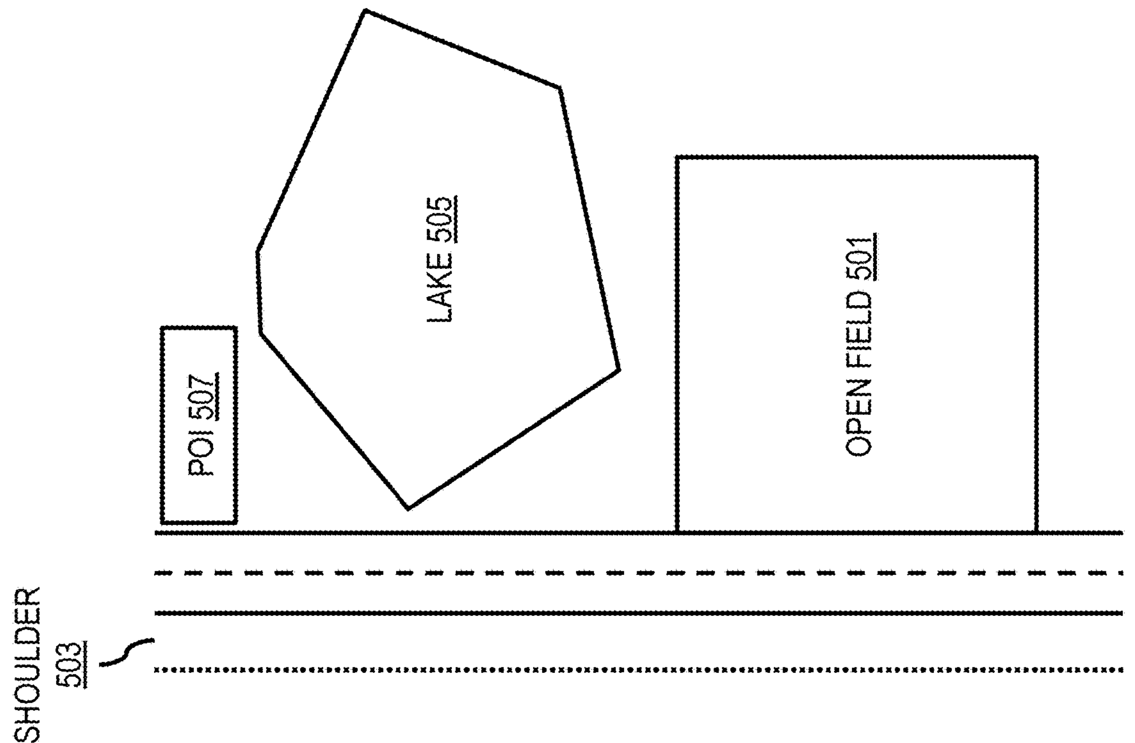
FIGS. 5A-5C are diagrams illustrating example ad-hoc runaway vehicle safety locations, according to one example embodiment.

In one embodiment, as shown in the example of FIG. 5A, the one or more topographical features that are associated with ad-hoc runaway vehicle safety locations include but are not limited an open field 501, a large shoulder 503, a lake 505, and/or the like. In one embodiment, other topographical features can be considered including but not limited to an incline relative to a road on which the vehicle is traveling, a ground material that is softer than a threshold value, or a combination thereof.

In one embodiment, the runaway vehicle safety location is selected to avoid one or more points of interest (POIs) within a threshold proximity. For example, certain categories of POIs can be avoided such as those associated with high populations or otherwise sensitive populations (e.g., schools, parks, etc.). In the example of FIG. 5A, two candidate runaway vehicle safety locations (e.g., an open field 501, and lake 505) have been determined according to the various embodiments described herein. However, a POI 507 (e.g., a school) is located within a threshold proximity of the lake 507. Accordingly, the map data module 203 recommends the open field 501 over the lake 507 as a runaway vehicle safety location.

Figure 5B:
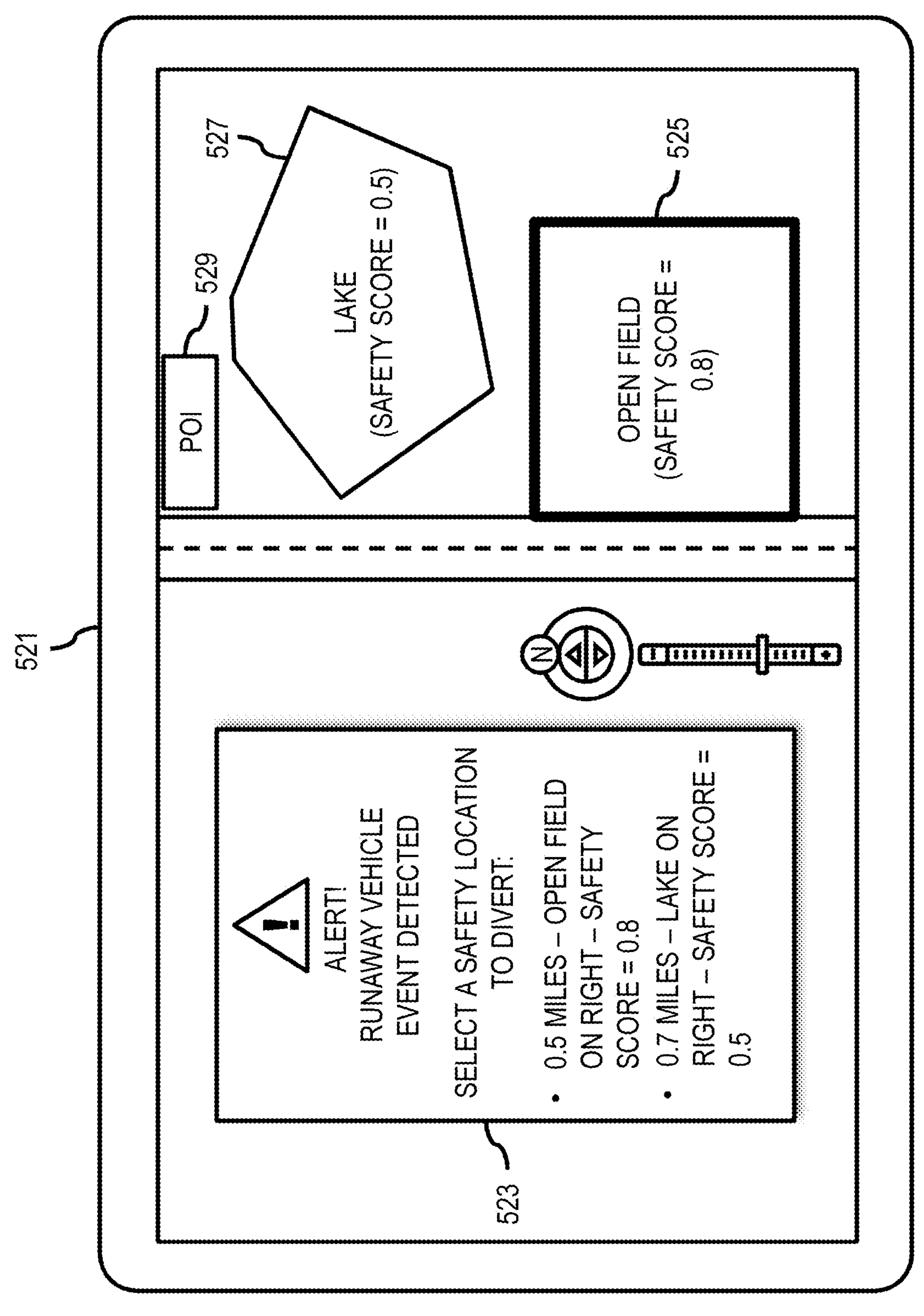

In one embodiment, as shown in FIG. 5B, the map data module 203 can present a user interface 521 on a device (e.g., UE 111, vehicle navigation/information display, etc.) associated with the runaway vehicle 101 so that the driver or passenger of the vehicle can review and select the candidate runaway vehicle safety locations. FIG. 5B continues the example of FIG. 5A and displays an alert message 523 stating "Alert! Runaway Vehicle Event Detected" to inform the driver that his/her vehicle 101 is in a runaway condition. The alert message 523 also requests that the driver "Select a safety location to divert:" and presents information of the two candidate locations determined as described in the embodiments above. For example, the alert message 523 lists the open field 501 of FIG. 5A as a first option along with a distance to location and an estimated safety score (e.g., "0.5 Miles—Open field on right—Safety Score=0.8") and the lake 505 of FIG. 5A as a second option (e.g., "0.7 Miles—Lake on right—Safety Score=0.5").

In this example, the options are presented in order based on safety score. In one embodiment, the safety score can be computed as a normalized range from 0.0 to 1.0 to reflect the suitability of a candidate vehicle runaway safety location for safely stopping or slowing down the runaway vehicle 101. The safety score can be computed based on factors such as but not limited to geographic size of the location relative to the estimated distance to stop the runaway vehicle 101, surface condition, proximity to nearby sensitive POIs (e.g., POI 507 of FIG. 7), likelihood of damage to the runaway vehicle 101 and/or surrounding area, and/or the like. As shown, the UI 521 also presents a representation 525 of the open field along with an indication of its safety score and a representation 527 of the lake with an indication of its safety score on a map. To provide additional situational awareness, the UI 521 can also present a representation 529 of the nearby sensitive POI. The UI 521 would than enable the driver or end user to use their best judgement and pick a suitable runaway vehicle safety location from the candidate locations generated by the map data module 203.

Figure 5C:
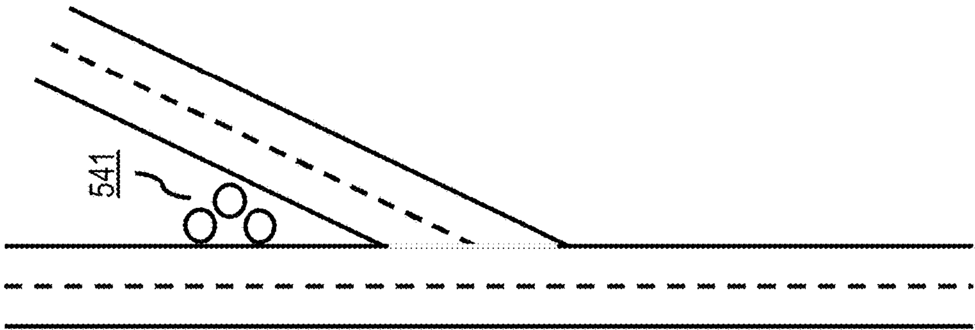

In one embodiment, the runaway vehicle safety locations can include locations where the runaway vehicle can more safely crash to slow down. For example, as shown in FIG. 5C, there are sometimes crash sand/water barrels 541 place by offramps, bridges, interchanges, etc. which specifically stop car, trucks, etc. The barrels 541 or other equivalent crash barriers (e.g., crash tolerant guard rails, etc.) can also be selected as potential runaway vehicle safety locations.

As previously discussed, in one embodiment, the map data module 203 can use contextual data (e.g., traffic, weather, lighting condition, etc.) to select runaway vehicle safety locations. For example, the map data module 203 can determine real-time or historical traffic data for a location of the vehicle. The runaway vehicle safety location is determined based on the real-time or historical traffic data. Similarly, in one embodiment, the map data module 203 can determine real-time or historical weather data for a location of the vehicle. The runaway vehicle safety location is then determined further based on the real-time or historical weather data.

Also as previously discussed, in one embodiment, the map data module 203 can use machine learning to determine the runaway vehicle safety location. In this embodiment, the map data module 203 interacts with the machine learning system to extract an input feature set from the at least one attribute of the vehicle, at least one topographical attribute of a current location of the vehicle, or a combination thereof. The machine learning system then provides the input feature set to a machine learning system 121 (e.g., a machine learning model 129 of the machine learning system 121) that is trained to predict the runaway vehicle safety location.

In step 305, the processing module 205 generates an alert message indicating the runaway vehicle safety location. In one embodiment, the output module 207 can interact with the routing module 211 to generate navigation guidance data from a location of the vehicle to the runaway vehicle safety location. The navigation guidance data can then be provided as an output for presentation on the device (e.g., as described below in step 307).

In step 307, the output module 207 provides the alert message for display on a device associated with the vehicle 101. In one embodiment, the output module 207 interacts with the vehicle control module 209 to activate one or more automated driving controls of the vehicle in response to the alert message.

In one embodiment, the output module 207 transmits the alert message to another vehicle within a threshold proximity of the vehicle. By way of example, the another vehicle activates one or more automated driving controls in response to the alert message to evade the vehicle, the runaway vehicle safety location, or a combination thereof.

Figure 6:
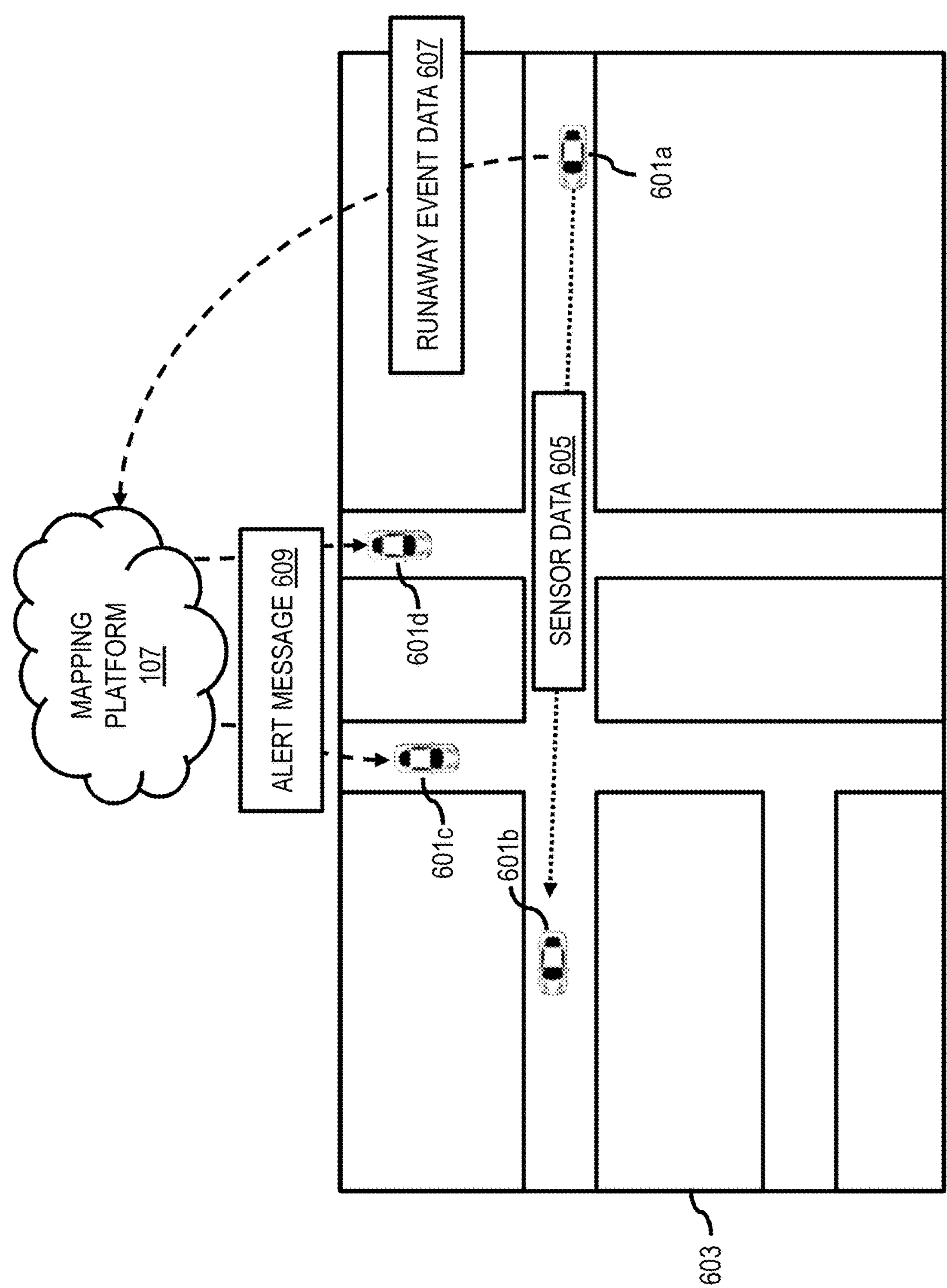
FIG. 6 is a diagram illustrating an example of transmitting runaway vehicle alert messages, according to one example embodiment.

FIG. 6 is a diagram illustrating an example of transmitting runaway vehicle alert messages, according to one example embodiment. In the example of FIG. 6, a vehicle 601*a* is traveling a road network 603 and collects sensor data 605 about another vehicle 601*b*. The application 109 (not shown) executing on a device of the vehicle 601*a* processes the sensor data 605 to determine that the vehicle 601*b* is experiencing a runaway vehicle event according to various embodiments described herein. The vehicle 601*a* transmits the detected runaway vehicle event data 607 (e.g., including a location and time of the event) to the mapping platform 107. In response, the mapping platform 107 determines that vehicles 601*c* and 601*d* are within a threshold proximity of vehicle 601*b*'s runaway vehicle event and transmits an alert message 609 to the vehicles 601*c* and 601*d* to warn the vehicles 601*c*/601*d* and/or the drivers/passengers of the detected runaway vehicle event. In one embodiment, the vehicles 601*c* and/or 601*d* can then be provided navigation routing guidance to avoid the runaway vehicle event. In addition or alternatively, if the vehicles 601*c* and 601*d* support autonomous operation, then automated driving controls can be activated to maneuver and avoid the runaway vehicle event.

It is noted that although the example of FIG. 6 is described with respect to a cloud-based alert messaging system (e.g., mediated by the mapping platform 107), it is contemplated that the vehicle 601*a* can use any means to transmit the alert message directly to the vehicles 601*c* and 601*d*. Examples of these means include but are not limited to vehicle-to-vehicle (V2V) communications, cellular communications, etc.

Figure 7:
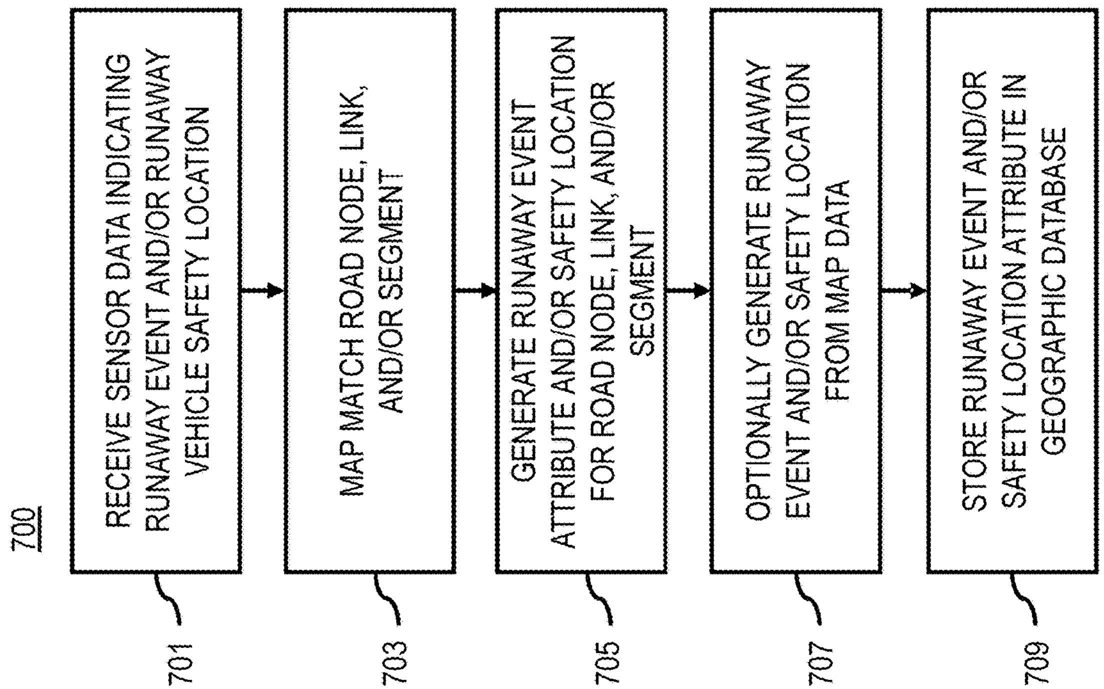
FIG. 7 is a flowchart of a process for mapping runaway vehicle events and/or runaway vehicle safety locations, according to one example embodiment.

FIG. 7 is a flowchart of a process 700 for mapping runaway vehicle events and/or runaway vehicle safety locations, according to one example embodiment. In various embodiments, the mapping platform 107, application 109, and/or any of the modules 201-211 may perform one or more portions of the process 700 and may be implemented in, for instance, a chip set including a processor and a memory as shown in FIG. 17 and/or other circuitry for performing one or more steps of the process 700. As such, mapping platform 107, application 109, and/or any of the modules 201-211 can provide means for accomplishing various parts of the process 700, as well as means for accomplishing embodiments of other processes described herein in conjunction with other components of the system 100. Although the process 700 is illustrated and described as a sequence of steps, its contemplated that various embodiments of the process 700 may be performed in any order or combination and need not include all of the illustrated steps.

In step 701, the sensor data module 201 receives sensor data 115, runaway vehicle event data 123, and/or runaway vehicle safety location data 131 from at least one vehicle 101, infrastructure device (e.g., a traffic camera 119), and/or any other equivalent device/vehicle indicating detected/predicted runaway vehicle event and/or runaway vehicle safety location. The received data also indicates at least a detected location.

In step 703, the map data module 203 map matches the detected location(s) of the runaway vehicle event and/or runaway vehicle safety location to at least one road node, link, and/or segment thereof of the geographic database 113. It is contemplated that that the map data module 203 can use any type of map matcher known in the art to perform the map matching (e.g., a point-based map matcher). In one embodiment, the map matching can be specific to a road node, road link, a segment of the road link (e.g., 5-meter segments of the road), and/or a lane of the road link. In this way, the runaway vehicle event and/or runaway vehicle safety location can be associated with a particular road node, link, segment, or area of the geographic database 113 and/or a travel lane of the road link. If map matching is performed to a lane level, then the resulting runaway vehicle event data 123 and/or runaway vehicle safety location data 131 can also be generated at a lane level.

After data ingestion and map matching, in step 705, the map data module 203 generates runaway vehicle event data 123 and/or runaway vehicle safety location data 131 (e.g., runaway vehicle attributes for corresponding road node, link, and/or segment data records) to indicate a probability of the presence of runaway vehicle events and/or runaway vehicle safety locations on the corresponding road node, link, and/or segment data records.

In one embodiment, the runaway vehicle event data 123 and/or runaway vehicle safety location data 131 can be generated per time epoch, per travel lane of the road link, and/or other any other contextual parameter (e.g., weather, vehicle type, other road link attributes—functional class, bi-directionality, etc.). For example, the presence of runaway vehicle events and/or runaway vehicle safety locations can vary according to time of day, day of the week, month, season, vehicle attribute, etc. In one embodiment, multiple contextual parameters can be combined to segment the runaway vehicle event data 123 and/or runaway vehicle safety location data 131. When both traffic and weather segmentation is desired, a runaway vehicle attribute value can be calculated for each time epoch for each lane of each road node, link, and/or segment.

In one embodiment, the mapping platform 107 can also determine runaway vehicle event data 123 and/or runaway vehicle safety location data 131 based on map data in addition or as an alternate to the sensor-data approaches described above. Accordingly, in step 707, the map data module 203 can optionally generate the runaway vehicle attributes for road links from map data. In other words, the occurrence of runaway vehicle events and runaway vehicle safety locations can be determined in combination with or independently of sensor data 115. For example, the map data module 203 processes map data of the geographic database 113 for one or more road links to identify at least one map feature indicative of the presence of runaway vehicle events (e.g., a road segment with a decline above a threshold value for greater than a threshold distance) and/or runaway vehicle safety locations (e.g., geographic areas with open fields, shoulders, lakes, and/or any other location that provides suitable space without obstructions for slowing down or stopping a runaway vehicle 101). The map data module 203 can then use the map features to determine the likelihood of a runaway event occurring at a location associated with the identified map features and/or the likelihood that a candidate geographic area associated with the map features can be used as a runaway vehicle safety location. In one embodiment, the likelihood can be computed based on a classification probability output from a machine learning model 129 trained to predict a runaway event and/or runaway vehicle safety location from the identified map features.

In step 709, the output module 207 stores the runaway vehicle event data 123 and/or runaway vehicle safety location data 131 generated according to the embodiments described above in the geographic database 113 as an attribute of the corresponding road link data record. In one embodiment, the output module 207 can store and/or publish the runaway vehicle event data 123 and/or runaway vehicle safety location data 131 a runaway vehicle data layer of the geographic database 113. The runaway vehicle data layer, for instance, segregates the runaway vehicle event data 123 and/or runaway vehicle safety location data 131 into separate data structures or layers from the underlying geographic topology data while maintaining links to the underlying topology to relate the runaway vehicle event data 123 and/or runaway vehicle safety location data 131 to features of the digital map.

Figure 8:
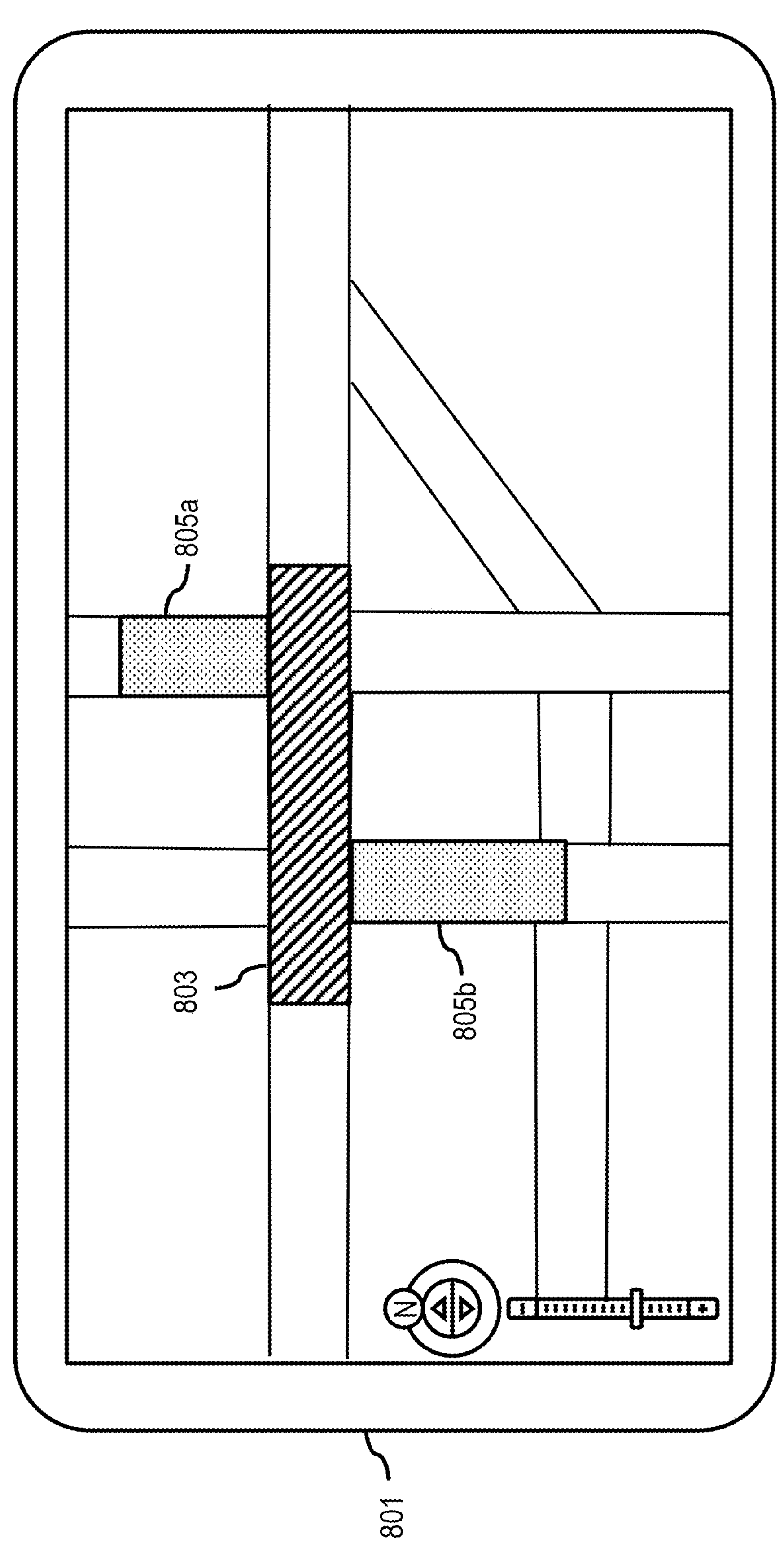
FIG. 8 is a diagram illustrating an example user interface for presenting runaway vehicle map data, according to example embodiment.

In one embodiment, the runaway vehicle event data 123 and/or runaway vehicle safety location data 131 generated by the mapping platform 107 can be used for a variety of uses cases. For, the runaway vehicle event data 123 and/or runaway vehicle safety location data 131 can be used to present a mapping user interface indicating the presence of runaway vehicle events and/or runaway vehicle safety locations on various road links of the geographic database 113. FIG. 8 is a diagram of an example user interface for presenting runaway vehicle event data 123 and/or runaway vehicle safety location data 131, according to one embodiment. In this example, a user interface (UI) 801 is generated for a UE 111 or other equivalent device (e.g., a vehicle navigation device, mobile device, etc.) that presents a map depicting road nodes, links, and/or segments in a geographic area. runaway vehicle event data 123 and/or runaway vehicle safety location data 131 from the geographic database 113 or the runaway vehicle data layer is queried to determine the detected and/or predicted runaway vehicle event densities on the road links in the UI 801. Based on this query, the UI 801 renders the road link 803 in a darker shade to indicate that runaway vehicle event density is classified as high (e.g., above a maximum threshold), and renders links 805*a* and 805*b* in a lighter shade to indicate that the runaway vehicle density is classified as low (e.g., below the maximum threshold but above a lower threshold). The remaining nodes, links, and/or segments are presented with no shading to indicate that their runaway vehicle densities are low (e.g., below the lower threshold).

Figure 9:
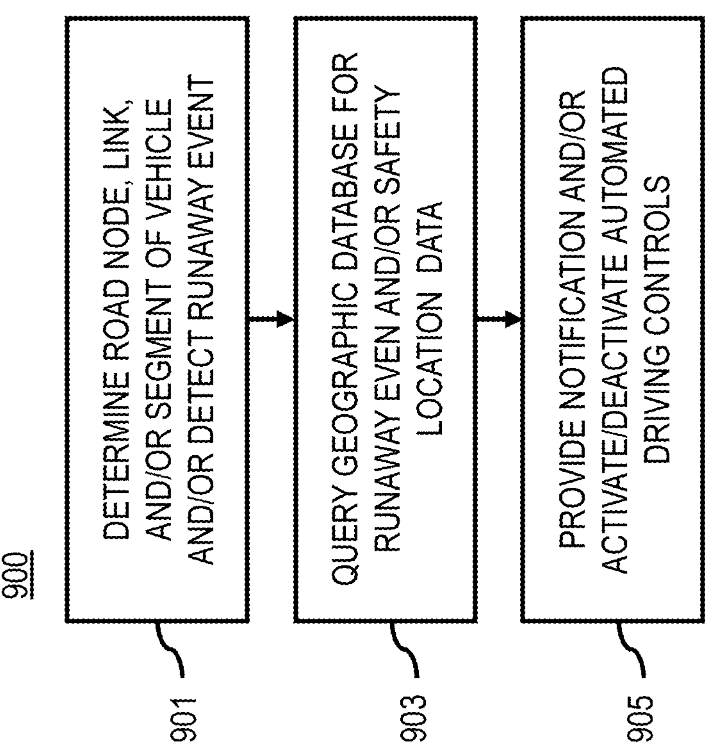
FIG. 9 is a flowchart of a process for autonomous vehicle operation based on runaway vehicle map data, according to one example embodiment.

FIG. 9 is a flowchart of a process 900 for autonomous vehicle operation based on runaway vehicle map data, according to one example embodiment. In various embodiments, the mapping platform 107, application 109, and/or any of the modules 201-211 may perform one or more portions of the process 900 and may be implemented in, for instance, a chip set including a processor and a memory as shown in FIG. 17 and/or other circuitry for performing one or more steps of the process 900. As such, mapping platform 107, application 109, and/or any of the modules 201-211 can provide means for accomplishing various parts of the process 300, as well as means for accomplishing embodiments of other processes described herein in conjunction with other components of the system 100. Although the process 900 is illustrated and described as a sequence of steps, its contemplated that various embodiments of the process 900 may be performed in any order or combination and need not include all of the illustrated steps.

In this use case, a vehicle 101 is equipped with a vehicle control module (e.g., UE 111, application 109, component thereof, or equivalent) capable of accessing the runaway vehicle event data 123 and/or runaway vehicle safety location data 131 as generated according to the embodiments described above. In step 901, the vehicle control module determines a road link on which the vehicle is traveling or expects to travel. For example, the vehicle control module can determine a current location (e.g., [latitude, longitude]) using a location sensor (e.g., a GPS or other satellite-based location sensor) of the vehicle 101. The current location can then be map matched to the geographic database 113 to identify the road node, link, segments, etc. (e.g., via a road link ID) as stored in the geographic database 113. To determine expected nodes/links/segments, the vehicle control module can determine a current navigation route being used to determine upcoming road nodes, links, and/or segments or otherwise predict upcoming routes based on historical travel data, context, nearest road links, etc.

In step 903, the vehicle control module queries the geographic database 113 and/or runaway vehicle data layer for runaway vehicle data (e.g., runaway vehicle events, runaway vehicle safety locations, etc.) of the identified road nodes, links, and/or segments. In one embodiment, the querying of the geographic database further comprises determining that a time at which the vehicle is traveling or expects to travel on the road node/link/segment lies within a time epoch associated with the retrieved runaway vehicle attribute.

In step 905, the vehicle control module provides a notification to a driver or user to activate or deactivate an automated driving control of the vehicle while the vehicle 101 avoids the road or travels on the road node, link, and/or segment (if unavoidable). In one embodiment, using runaway vehicle event data 123 and/or runaway vehicle safety location data 131 data to operate a vehicle 101 can include determining what autonomous driving mode or controls to use or determining which vehicle sensor to use to enhance runaway vehicle detection, avoidance, and/or mitigation. In one embodiment, in addition or as an alternate to providing a notification, the vehicle control module can automatically (e.g., without user input) activate or deactivate an automated driving control or vehicle sensor based on the runaway vehicle event data 123 and/or runaway vehicle safety location data 131.

With respect to autonomous driving, for instance, as a vehicle drives on a road link at time t, if the vehicle control module determines that road link's runaway vehicle attribute is satisfies a threshold criterion (e.g., probability of the presence of runaway vehicles is above a threshold value), the vehicle control module can select whether to operate or provide a notification to operate the vehicle in fully autonomous mode, semi-autonomous mode, or under manual control by the driver.

It is noted that the three driving modes (e.g., autonomous mode, semi-autonomous, manual, etc.) are provided by way of illustration and not as limitations. It is contemplated that the vehicle can support any number of autonomous driving modes. The vehicle, for instance, can be an autonomous vehicle or highly assisted driving vehicle that is capable of sensing its environment and navigating within a road network without driver or occupant input. It is noted that autonomous vehicles and highly assisted driving vehicles are part of a spectrum of vehicle classifications that can span from no automation to fully autonomous operation. For example, the U.S. National Highway Traffic Safety Administration ("NHTSA") defines six levels of vehicle automation:

Level 0 (No-Automation)—"Zero autonomy; the driver performs all driving tasks.";

Level 1 (Driver Assistance)—"Vehicle is controlled by the driver, but some driving assist features may be included in the vehicle design.";

Level 2 (Partial Automation)—"Vehicle has combined automated functions, like acceleration and steering, but the driver must remain engaged with the driving task and monitor the environment at all times.";

Level 3 (Conditional Automation)—"Driver is a necessity, but is not required to monitor the environment. The driver must be ready to take control of the vehicle at all times with notice.";

Level 4 (High Automation)—"The vehicle is capable of performing all driving functions under certain conditions. The driver may have the option to control the vehicle."; and Level 5 (Full Automation)—"The vehicle is capable of performing all driving functions under all conditions. The driver may have the option to control the vehicle."

The various embodiments described herein are applicable to vehicles that are classified in any of the levels of automation (levels 0-5) discussed above.

Figure 10:
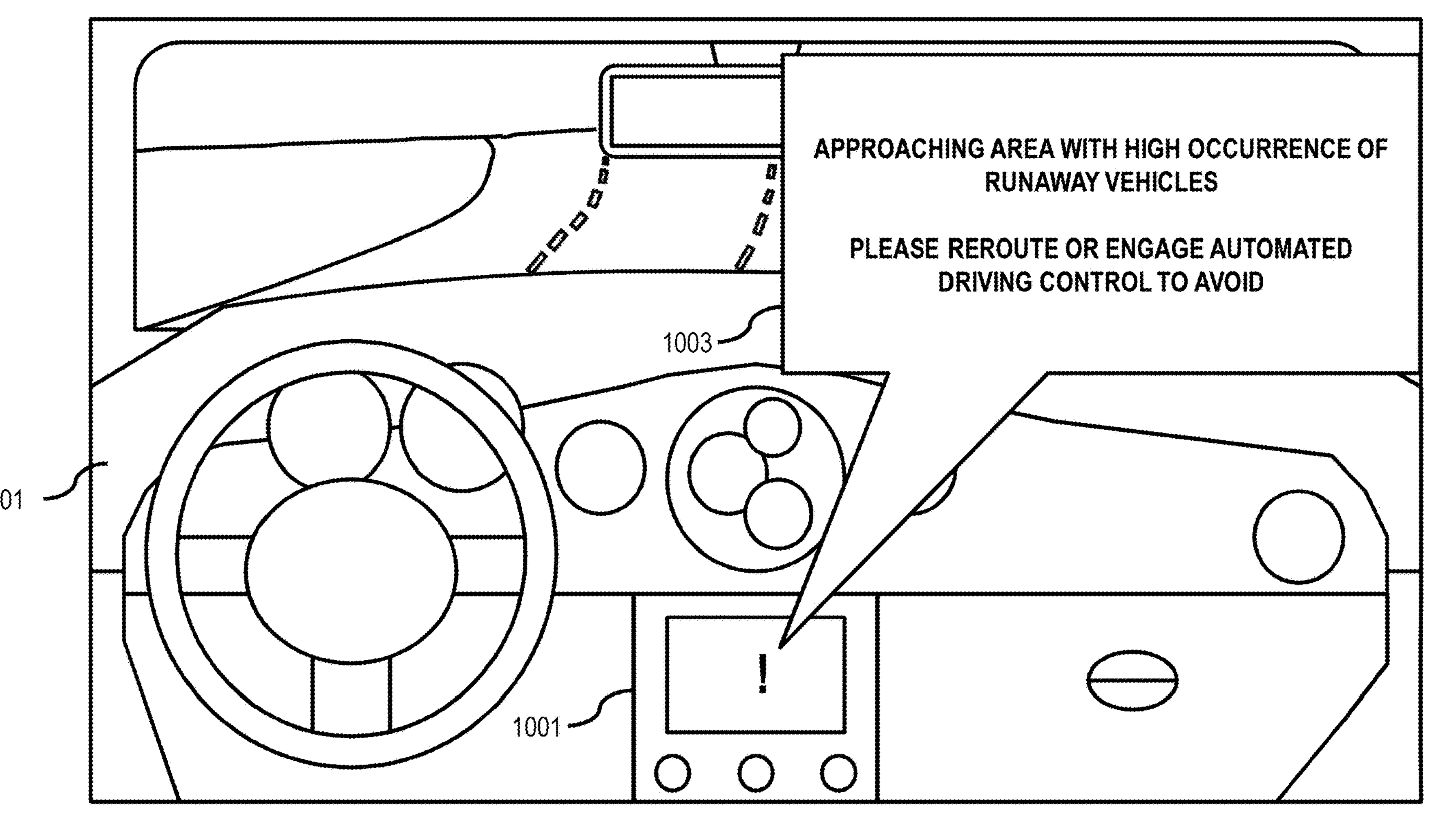
FIG. 10 is a diagram illustrating an example of activating/deactivating an automated driving controls based on runaway vehicle data, according to one example embodiment.

FIG. 10 is a diagram illustrating an example of activating/deactivating an automated driving controls based on runaway vehicle data, according to one example embodiment. In the example of FIG. 10, the vehicle 101 is traveling on a road segment that has been previously mapped for the occurrence of runaway vehicles. This runaway vehicle event data 123 and/or runaway vehicle safety location data 131 is stored in the geographic database 113 and/or runaway vehicle data layer for access by the vehicle 101. The vehicle 101 also is currently operating in manual driving mode. As the vehicle 101 approaches the segment, the vehicle 101 queries the geographic database 113 for runaway vehicle event data 123 and/or runaway vehicle safety location data 131 for the upcoming road segment. The query results indicate that upcoming road segment has a mapped high occurrence of runaway vehicles (e.g., occurrence greater than a threshold value). The runaway vehicle data for upcoming road segment triggers the vehicle system 1001 (e.g., a UE 111 or equivalent) to present an alert message 1003 to indicate that that the vehicle 101 is approaching an area with high occurrence of runaway vehicles and instructs the driver to reroute or activate automated driving control to avoid the segment.

In addition to the autonomous driving use case, in one embodiment, the vehicle 101 can determine when to activate or deactivate additional vehicle sensors depending on whether the runaway vehicle attributes for a road link on which the vehicle is traveling or expects to travel meets a threshold criterion. For example, vehicles can be equipped with sensors ranging from simple and low-cost sensors (e.g., camera sensors, light sensors, etc.) to highly advanced and often very expensive sensors such as Light Imaging Detection and Ranging (LiDAR) sensors, radar, infrared sensors, and the like. In many cases, these sensors can generate large volumes of data, requiring significant computing resources to process. Because vehicles typically demand high reliability and redundancy for its components, including computing components, this high volume of sensor output data can overwhelm the resources available at the vehicle. In addition, many of advanced sensors (e.g., LiDAR, radar, etc.) have moving, retractable, or other parts that may be susceptible excessive wear and premature failure if used continuously. In other words, the vehicle sensors 117 may include an advanced capability to detect the presence of runaway vehicles on the road link at a performance level greater than other vehicle sensors. However, the vehicle sensor with the advanced capability is operated on demand for runaway vehicle detection to conserve resources while the other less-advanced vehicle sensors are operated continuously.

Accordingly, in one embodiment, the runaway vehicle event data 123 and/or runaway vehicle safety location data 131 generated according to the embodiments described herein can be used to selectively activate or deactivate sensors based on whether the vehicle is driving on a road node, link, and/or segment with expected runaway vehicle presence. For example, as a vehicle drives a road link at time t, if the vehicle 101 determines that a corresponding runaway vehicle attribute (e.g., runaway vehicle occurrence) is above a threshold value during the time epoch in which time t lies, the vehicle can automatically trigger advanced sensors such as LiDAR, infrared, radar, etc. instead of relying on less advance (and potentially less reliable sensors) such as a camera sensor to increase situational awareness and improve driver safety. Conversely, if the vehicle 101 determines that the corresponding runaway vehicle attribute is below the threshold value then the advanced sensors can be deactivated to conserve resources.

Figure 11:
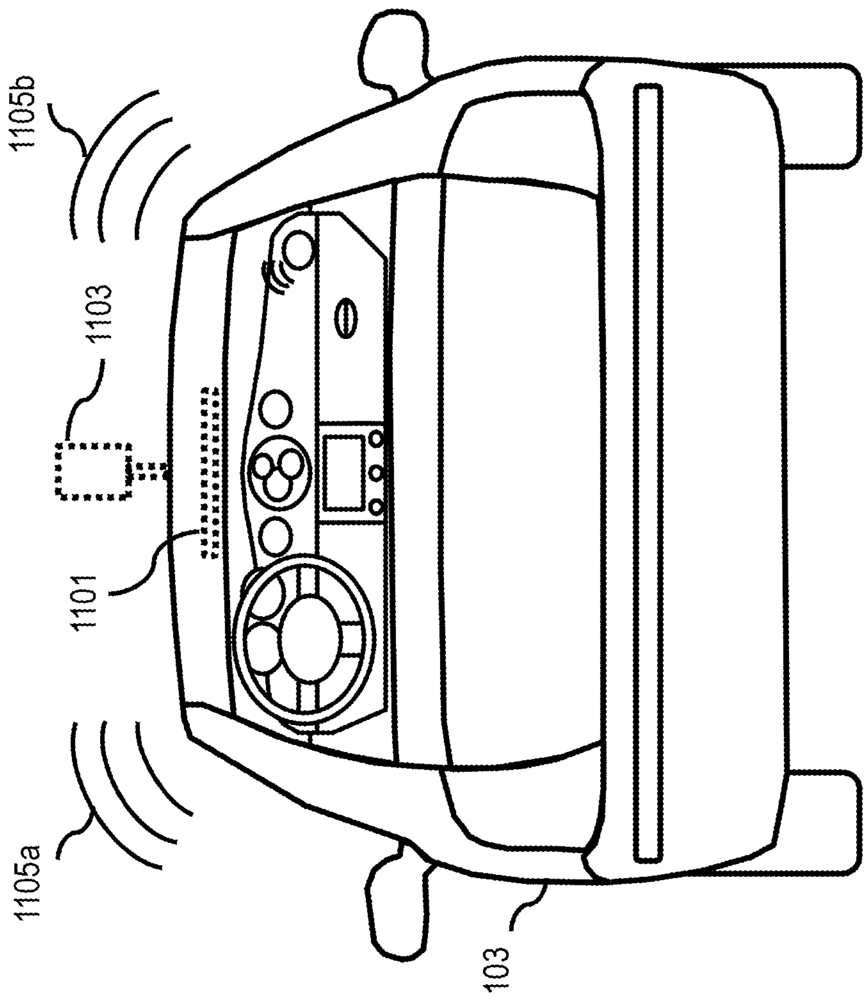
FIG. 11 is a diagram illustrating an example of activating/deactivating vehicle sensors based on runaway vehicle data, according to one embodiment.

FIG. 11 is a diagram illustrating an example of activating/deactivating vehicle sensors based on runaway vehicle data, according to one embodiment. As shown, the vehicle 101 is equipped with a camera sensor 1101, a LiDAR sensor 1103, and infrared sensors 1105*a* and 1105*b* (also collectively referred to as infrared sensors 1105). The LiDAR sensor 1103 and the infrared sensors 1105 are examples of the advanced sensors as described above. In a normal mode of operation, the camera sensor 1101 is operated continuously as the vehicle 101 travels to detect runaway vehicles at lower performance levels than the advanced sensors. Under this normal mode, the LiDAR sensor 1103 and infrared sensors 1105 are deactivated until the runaway vehicle event data 123 and/or runaway vehicle safety location data 131 indicate that the vehicle 101 is traveling on a road link with a high occurrence of runaway vehicles.

Figure 12:
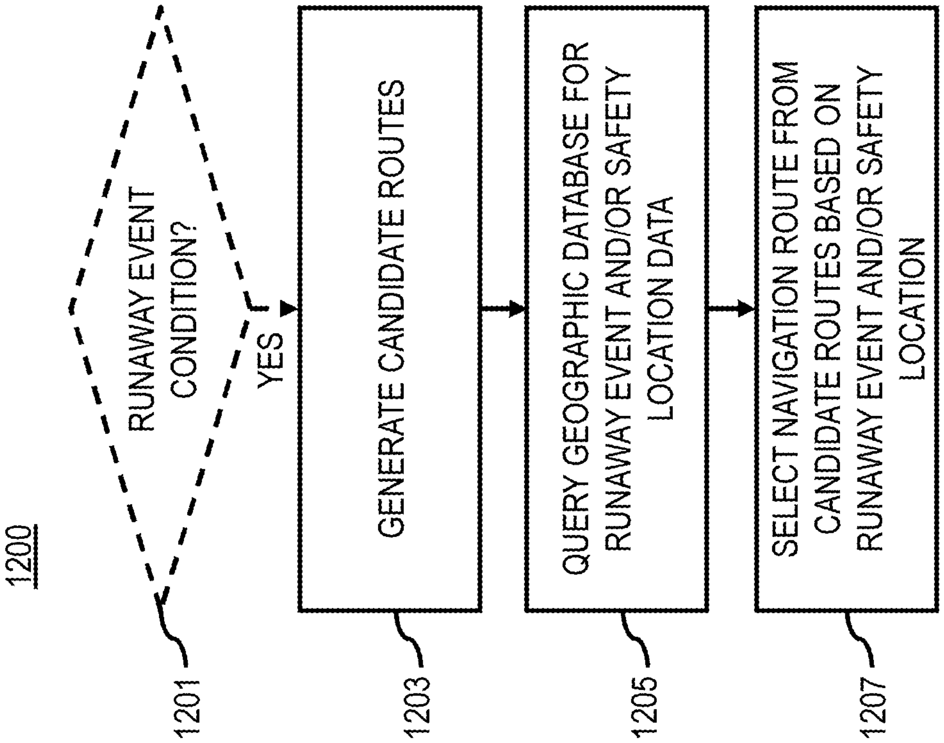
FIG. 12 is a flowchart of a process for determining a navigation route based runaway vehicle data, according to one embodiment.

FIG. 12 is a flowchart of a process 1200 for determining a navigation route based runaway vehicle data, according to one embodiment. In various embodiments, the mapping platform 107, application 109, and/or any of the modules 201-211 may perform one or more portions of the process 1200 and may be implemented in, for instance, a chip set including a processor and a memory as shown in FIG. 17 and/or other circuitry for performing one or more steps of the process 1200. As such, mapping platform 107, application 109, and/or any of the modules 201-211 can provide means for accomplishing various parts of the process 1200, as well as means for accomplishing embodiments of other processes described herein in conjunction with other components of the system 100. Although the process 1200 is illustrated and described as a sequence of steps, its contemplated that various embodiments of the process 1200 may be performed in any order or combination and need not include all of the illustrated steps.

In yet another use case, the mapping platform can use the runaway vehicle event data 123 and/or runaway vehicle safety location data 131 for generating navigation routes (e.g., to minimize potential exposure to runaway vehicles along a route and/or to mitigate a runaway vehicle event condition) as described in the various embodiments process 1200.

In one scenario, a vehicle or driver may request a route that minimizes exposure to or mitigates the occurrence of a runaway vehicle event. For example, autonomous vehicles may be configured to favor routes where there is less potential to collide with runaway vehicles. There may also be any number of other triggering conditions that can initiate a request for a route that minimizes exposure to or mitigates the occurrence of a runaway vehicle event. For example, a vehicle may detect that one or more of its sensors (e.g., camera, LiDAR, infrared, radar, etc.) has failed, thereby reducing the vehicles capability to detect runaway vehicles. As a result, the vehicle may request a navigation route with minimal runaway vehicle occurrence. In another example, a vehicle detects that one or more road conditions or events (e.g., weather, driving in a mountainous region, etc.) may make potential runaway vehicle collisions more likely (e.g., slippery pavement due to oil spill or black ice, visibility reduced due to fog or heavy rain, etc.). Accordingly, the vehicle may request a route that minimizes the runaway vehicle occurrence.

Figure 13:
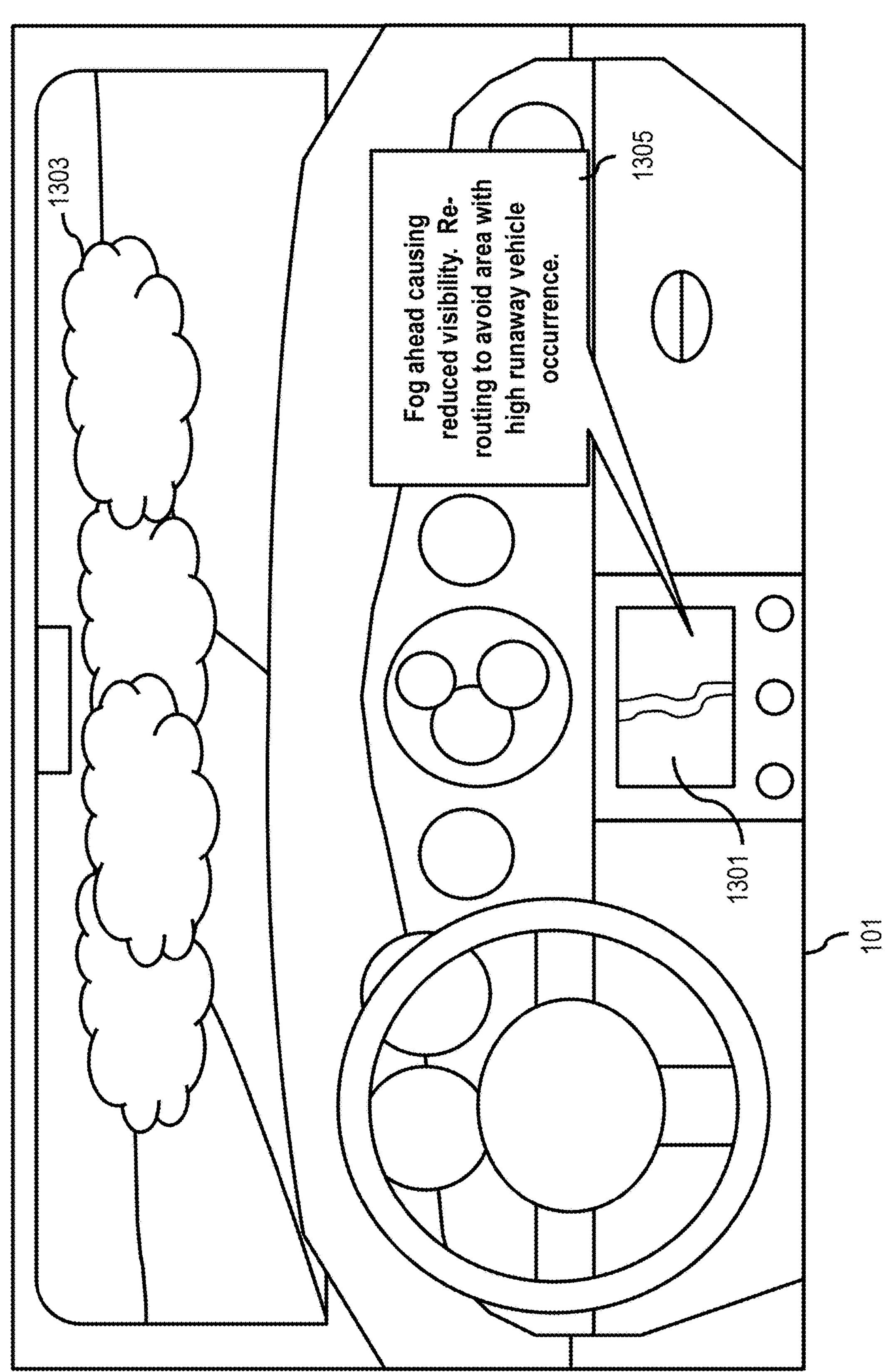
FIG. 13 is a diagram illustrating an example of initiating runaway vehicle data-dependent route calculation based on a triggering condition, according to one example embodiment.

FIG. 13 is a diagram illustrating an example of initiating runaway vehicle data-dependent route calculation based on a triggering condition, according to one example embodiment. In the example of FIG. 13, a vehicle 101 is driving on a road segment. The vehicle system 1301 detects that there is fog 1303 on the upcoming downhill road segment with a high occurrence of runaway vehicles. To mitigate this condition, the system 1301 initiates a re-routing of the vehicle 101 to minimize traveling on road links with potential runaway vehicle occurrence. The system 1301, for instance, presents an alert message 1305 that indicates "Fog ahead causing reduced visibility. Re-routing to avoid area with high runaway vehicle occurrence."

In summary, in one embodiment, the routing module 211 of the mapping platform 107 may initiate the determining a runaway vehicle-dependent navigation route based one detecting one or more triggering conditions (e.g., detection or prediction of a runaway vehicle event) (step 1201). The routing module 211 may also initiate the routing based on other triggering conditions such as but not limited to determining that one or more sensors capable of detecting a vulnerable road user is not operating or not equipped on the vehicle, detecting an occurrence a road event, a road condition, or a combination thereof. In one embodiment, detecting a triggering condition can be optional. In this case, the routing module 211 can skip optional step 1201 and begin the process 1200 at step 1203.

In step 1203, the routing module 211 generates one or more candidate navigation routes for a vehicle. The routing can be based on a request to mitigate the occurrence of a runaway vehicle event (e.g., for a vehicle that is not experiencing the runaway vehicle event to avoid the runaway vehicle event, or for vehicle that is experiencing the runaway vehicle event by finding a route to a selected runaway vehicle safety location). It is contemplated that routing module 211 can use any navigation routing engine known in the art. In one embodiment, if lane level information is available, the candidate routes can also include lane level routing guidance. The candidate routes, for instance, can contain a sequence of road nodes, links, and/or segments that are to be traveled.

In step 1205, the routing module 211 queries the geographic database 113 and/or runaway vehicle data layer for the runaway vehicle event data 123 and/or runaway vehicle safety location data 131 for a respective set of road nodes, links, and/or segments in each of the one or more candidate navigation routes. In one embodiment, the routing module 211 can consider the timing of the navigation route (e.g., start time of the route, time at each road link in the route, etc.) to query for the runaway vehicle event data 123 and/or runaway vehicle safety location data 131 from the corresponding time epochs. If, for instance, the vehicle is expected to drive on the first road node, link, and/or segment of a candidate route at a time t, the routing module 211 can query the runaway vehicle event data 123 and/or runaway vehicle safety location data 131 from a time epoch in which the time t lies. Then the timing for each subsequent road node, link, and/or segment in the candidate route can be determined to query for the appropriate time epochs. The runaway vehicle query results can then be grouped according to each candidate route.

In step 1207, the routing module 211 selects the navigation route for the vehicle from among the one or more candidate navigation routes based on the runaway vehicle event data 123 and/or runaway vehicle safety location data 131. In one embodiment, the navigation route is selected to minimize exposure to the occurrence of a runaway vehicle event. In other cases, the navigation route is selected to direct a runaway vehicle to the nearest runaway vehicle safety location that mitigates the safety or meets the selection factors discussed with respect to the various embodiments of the location selection factors described above. The routing module 211 can use, for instance, a cost-function or equivalent to minimize the probability of the presence of runaway vehicles.

Figure 14:
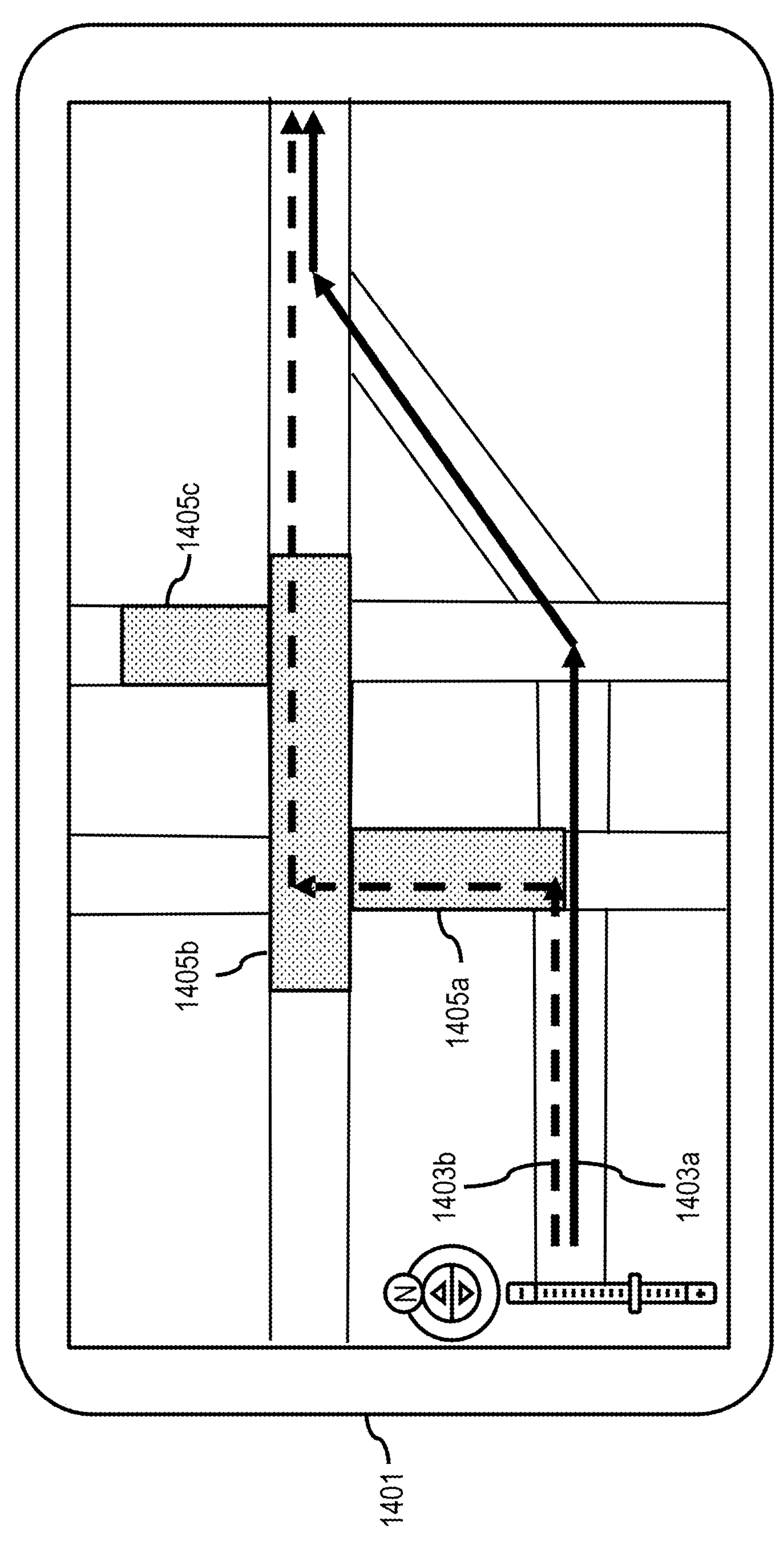
FIG. 14 is a diagram of an example user interface for presenting routing options based on runaway vehicle data, according to one embodiment.

In one embodiment, the routing module 211 can interact with the vehicle control module 209 to automatically use the selected route to configure an autonomous vehicle to drive the selected route. Alternatively, the route can be presented along with other candidate routes in a navigation user interface on a user device. FIG. 14 is a diagram of an example user interface for presenting routing options based on the runaway vehicle event data 123 and/or runaway vehicle safety location data 131, according to one embodiment. As shown in the UI 1401, the mapping platform 107 has generated and evaluated at least two candidate routes 1403*a* and 1403*b* based on the runaway vehicle event data 123 and/or runaway vehicle safety location data 131 for the road links in each route. The evaluation, for instance, is to minimize the use of road links with higher runaway vehicle occurrence. In this example, the route 1403*b* includes or passes near at least three road links 1405*a*, 1405*b*, and 1405*c* that have mapped runaway vehicle attributes that are classified as high (e.g., runaway vehicle occurrence above a threshold value) according to the runaway vehicle event data 123 and/or runaway vehicle safety location data 131 in the geographic database 113 and/or runaway vehicle data layer. In contrast, the route 1403*a* passes by only road link 1405*a* that has a high occurrence of runaway vehicles. Accordingly, the minimum aggregate occurrence of runaway vehicles is on route 1405*a*. The mapping platform 1405*a* highlights the recommended route 1405*a* with a solid line and presents the route 1405*b* as an alternate route option indicated by a dotted line.

Returning to FIG. 1, in one embodiment, the mapping platform 107 has connectivity over a communication network 133 to the services platform 135 that provides one or more services 125. By way of example, the services 125 may be third-party services and include mapping services, navigation services, travel planning services, notification services, social networking services, content (e.g., audio, video, images, etc.) provisioning services, application services, storage services, contextual information determination services, location-based services, information-based services (e.g., weather, traffic, news, etc.), etc. In one embodiment, the services platform 135 uses the output of the mapping platform 107 to provide services such as navigation, mapping, other location-based services, etc.

In one embodiment, the mapping platform 107 may be a platform with multiple interconnected components and may include multiple servers, intelligent networking devices, computing devices, components and corresponding software for providing a runaway vehicle detection system. In addition, it is noted that the mapping platform 107 may be a separate entity of the system 100, a part of the one or more services 125, a part of the services platform 135, or included within the vehicle 101 or UE 111 (e.g., application 109).

In one embodiment, content providers 127 may provide content or data (e.g., including geographic data, sensor data, etc.) to the geographic database 113, the mapping platform 107, the services platform 135, the services 125, the vehicle 101, and/or the UE 111. The content provided may be any type of content, such as map content, textual content, audio content, video content, image content, etc. In one embodiment, the content providers 127 may provide content that may aid in the detecting and classifying of runaway vehicles or other related characteristics (e.g., runaway vehicle attributes and/or runaway vehicle safety locations). In one embodiment, the content providers 127 may also store content associated with the geographic database 113, mapping platform 107, services platform 135, services 125, UE 111, and/or vehicle 101. In another embodiment, the content providers 127 may manage access to a central repository of data, and offer a consistent, standard interface to data, such as a repository of the geographic database 113.

By way of example, the UE 111 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the application 109 can support any type of interface to the user (such as "wearable" circuitry, etc.). In one embodiment, the UE 111 may be associated with the vehicle 101 or be a component part of the vehicle 101.

In one embodiment, the vehicle 101 and/or UE 111 are configured with various sensors for generating or collecting runaway vehicle sensor data, vehicular sensor data, related geographic/map data, etc. In one embodiment, the sensed data represent sensor data associated with a geographic location or coordinates at which the sensor data was collected. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors 117 of the vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 101 may detect the relative distance of the vehicle from a runaway vehicle, runaway vehicle safety location, a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 101 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 133 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 107, services platform 135, services 125, UE 111, vehicle 101, and/or content providers 127 communicate with each other and other components of the system 100 using well known, new or still developing protocols. In this context, a protocol includes a set of rules defining how the network nodes within the communication network 133 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 15:
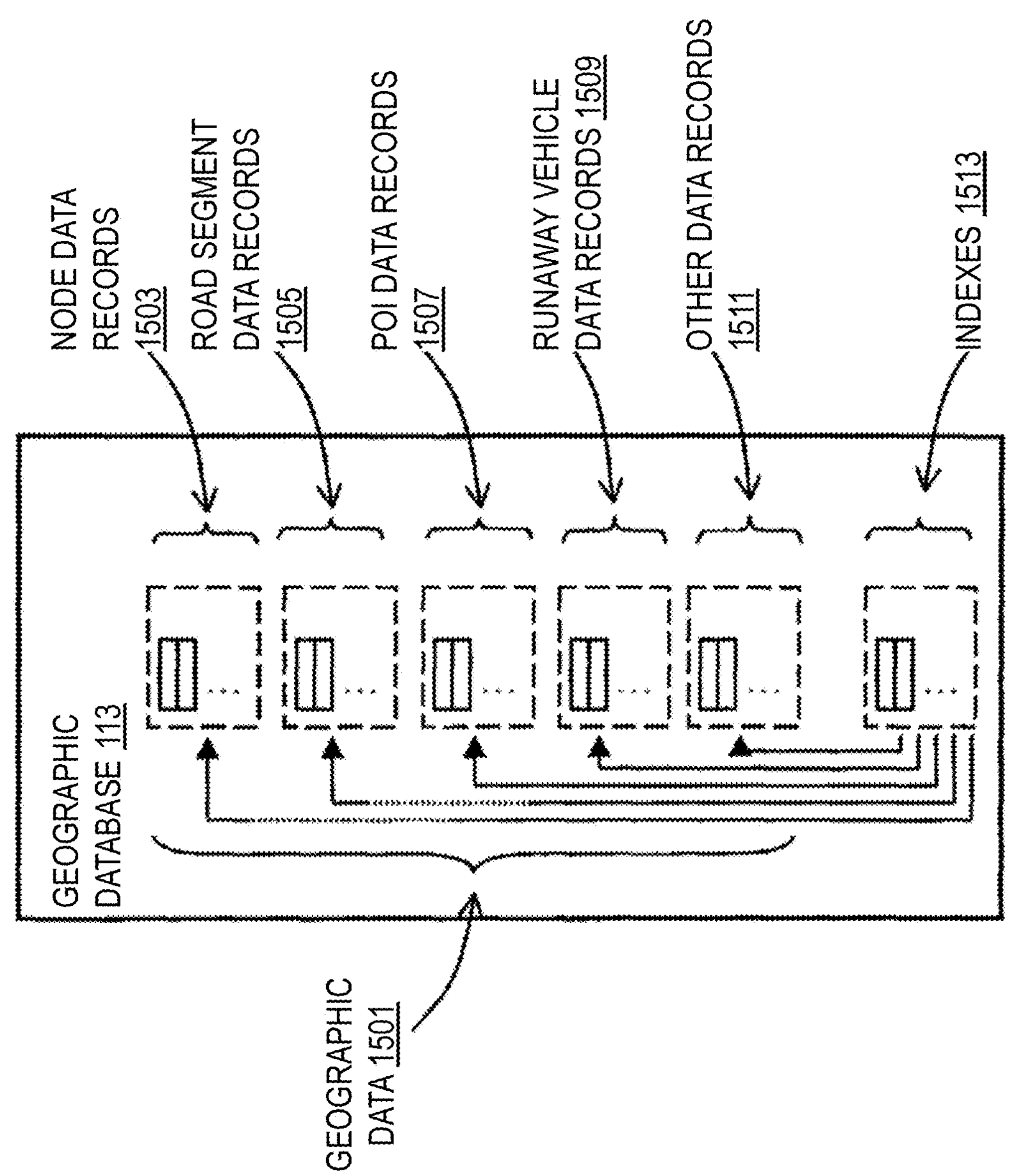
FIG. 15 is a diagram of a geographic database, according to one embodiment.

FIG. 15 is a diagram of a geographic database, according to one embodiment. In one embodiment, the geographic database 113 includes geographic data 1501 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 113 includes node data records 1503, road segment or link data records 1505, POI data records 1507, runaway vehicle data records 1509, other records 1511, and indexes 1513, for example. More, fewer or different data records can be provided. In one embodiment, additional data records (not shown) can include cartographic ("carto") data records, routing data, and maneuver data. In one embodiment, the indexes 1513 may improve the speed of data retrieval operations in the geographic database 113. In one embodiment, the indexes 1513 may be used to quickly locate data without having to search every row in the geographic database 113 every time it is accessed. For example, in one embodiment, the indexes 1513 can be a spatial index of the polygon points associated with stored feature polygons.

In exemplary embodiments, the road segment data records 1505 are links or segments representing roads, streets, or paths, as can be used in the calculated route or recorded route information for determination of one or more personalized routes. The node data records 1503 are end points corresponding to the respective links or segments of the road segment data records 1505. The road link data records 1505 and the node data records 1503 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 1507. The geographic database 113 can also include data about places, such as cities, towns, or other communities, and other geographic features, such as bodies of water, mountain ranges, etc. Such place or feature data can be part of the POI data records 1507 or can be associated with POIs or POI data records 1507 (such as a data point used for displaying or representing a position of a city).

In one embodiment, the geographic database 113 can also include runaway vehicle data records 1509 for storing the runaway vehicle event data 123, runaway vehicle safety location data 131, and/or any other data used or generated by the mapping platform 107 according to the various embodiments described herein. In one embodiment, the runaway vehicle data records 1509 can be associated with segments of a road link (as opposed to an entire link). It is noted that the segmentation of the road for the purposes of mapping the runaway vehicle data records 1509 can be different than the road link structure of the geographic database 113. In other words, the segments can further subdivide the links of the geographic database 113 into smaller segments (e.g., of uniform lengths such as 5-meters). In this way, runaway vehicle attributes can be represented at a level of granularity that is independent of the granularity or at which the actual road or road network is represented in the geographic database 113. In one embodiment, the runaway vehicle data records 1509 can be associated with one or more of the node records 1503, road segment records 1505, and/or POI data records 1507; or portions thereof (e.g., smaller or different segments than indicated in the road segment records 1505, individual lanes of the road segments, etc.) to provide situational awareness to drivers and provide for safer autonomous operation and routing of vehicles. In this way, the runaway vehicle event data 123 and/or runaway vehicle safety location data 131 stored in the runaway vehicle data records 1509 can also be associated with the characteristics or metadata of the corresponding record 1503, 1505, and/or 1507. In one embodiment, the runaway vehicle safety location data 131 (e.g., ad-hoc runaway vehicle safety location) can be represented and stored in the runaway vehicle data records 1509 as polygons that mark a corresponding area of the runaway vehicle safety locations.

In one embodiment, the geographic database 113 can be maintained by the content provider 127 in association with the services platform 135 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., runaway vehicle events, runaway vehicle safety locations, etc.) and/or record information about them, for example. Also, remote sensing, such as aerial or satellite photography, can be used.

In one embodiment, the geographic database 113 include high resolution or high definition (HD) mapping data that provide centimeter-level or better accuracy of map features. For example, the geographic database 113 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 113 is stored as a hierarchical or multilevel tile-based projection or structure. More specifically, in one embodiment, the geographic database 113 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a runaway vehicle detection system may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry);

(b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

Figure 16:
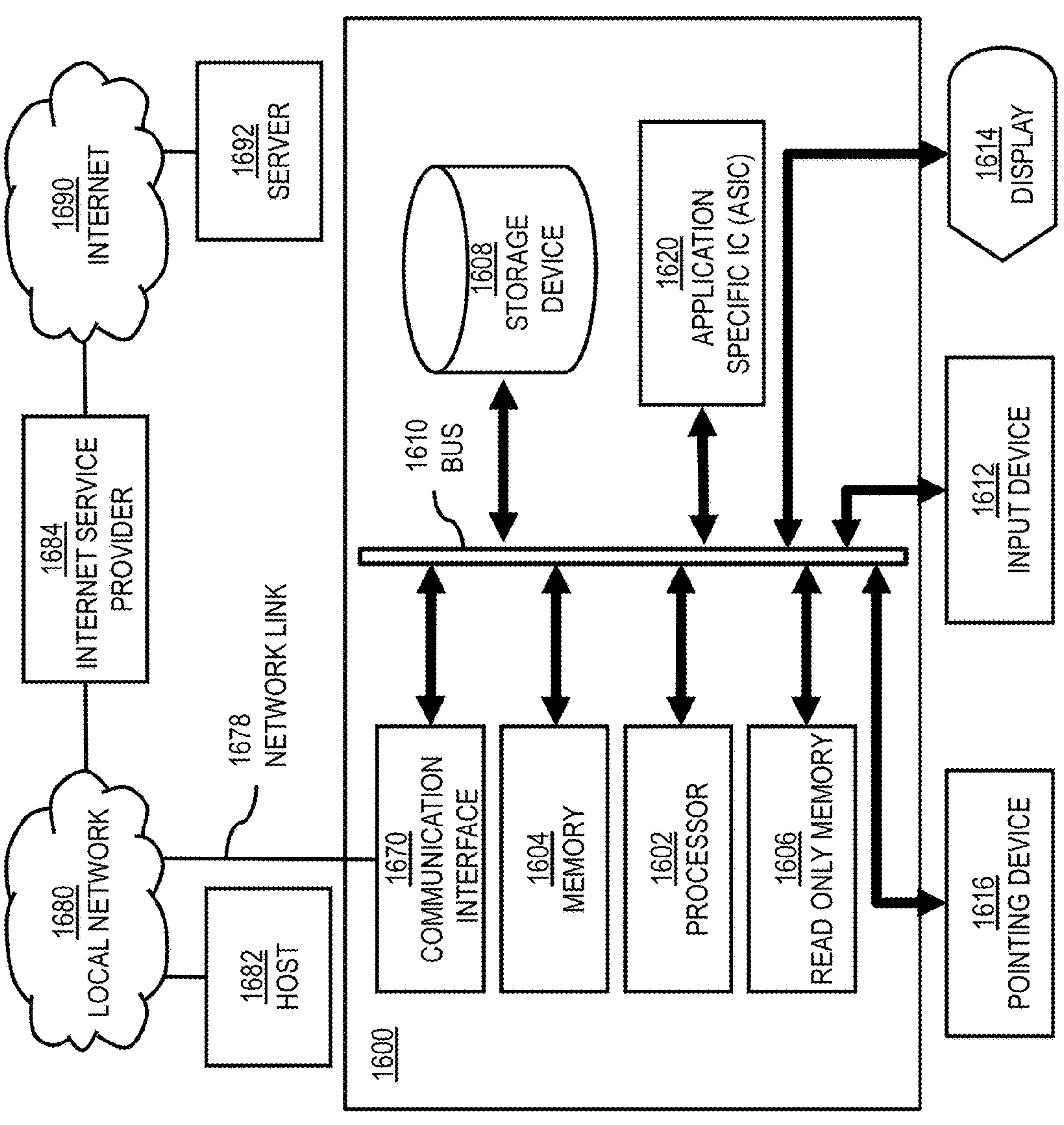
FIG. 16 is a diagram of hardware that can be used to implement an embodiment.

FIG. 16 illustrates a computer system 1600 upon which an embodiment of the invention may be implemented. Computer system 1600 is programmed (e.g., via computer program code or instructions) to provide a runaway vehicle detection system as described herein and includes a communication mechanism such as a bus 1610 for passing information between other internal and external components of the computer system 1600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1610 includes one or more parallel conductors of information so that information is transferred quickly among devices coupled to the bus 1610. One or more processors 1602 for processing information are coupled with the bus 1610.

A processor 1602 performs a set of operations on information as specified by computer program code related to providing a runaway vehicle detection system. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1610 and placing information on the bus 1610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1600 also includes a memory 1604 coupled to bus 1610. The memory 1604, such as a random access memory (RAM) or other dynamic storage device, stores information including processor instructions for providing a runaway vehicle detection system. Dynamic memory allows information stored therein to be changed by the computer system 1600. RAM allows a unit of information stored at a location called a memory address to be stored and retrieved independently of information at neighboring addresses. The memory 1604 is also used by the processor 1602 to store temporary values during execution of processor instructions. The computer system 1600 also includes a read only memory (ROM) 1606 or other static storage device coupled to the bus 1610 for storing static information, including instructions, that is not changed by the computer system 1600. Some memory is composed of volatile storage that loses the information stored thereon when power is lost. Also coupled to bus 1610 is a non-volatile (persistent) storage device 1608, such as a magnetic disk, optical disk or flash card, for storing information, including instructions, that persists even when the computer system 1600 is turned off or otherwise loses power.

Information, including instructions for providing a runaway vehicle detection system, is provided to the bus 1610 for use by the processor from an external input device 1612, such as a keyboard containing alphanumeric keys operated by a human user, or a sensor. A sensor detects conditions in its vicinity and transforms those detections into physical expression compatible with the measurable phenomenon used to represent information in computer system 1600. Other external devices coupled to bus 1610, used primarily for interacting with humans, include a display device 1614, such as a cathode ray tube (CRT) or a liquid crystal display (LCD), or plasma screen or printer for presenting text or images, and a pointing device 1616, such as a mouse or a trackball or cursor direction keys, or motion sensor, for controlling a position of a small cursor image presented on the display 1614 and issuing commands associated with graphical elements presented on the display 1614. In some embodiments, for example, in embodiments in which the computer system 1600 performs all functions automatically without human input, one or more of external input device 1612, display device 1614 and pointing device 1616 is omitted.

In the illustrated embodiment, special purpose hardware, such as an application specific integrated circuit (ASIC) 1620, is coupled to bus 1610. The special purpose hardware is configured to perform operations not performed by processor 1602 quickly enough for special purposes. Examples of application specific ICs include graphics accelerator cards for generating images for display 1614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1600 also includes one or more instances of a communications interface 1670 coupled to bus 1610. Communication interface 1670 provides a one-way or two-way communication coupling to a variety of external devices that operate with their own processors, such as printers, scanners and external disks. In general, the coupling is with a network link 1678 that is connected to a local network 1680 to which a variety of external devices with their own processors are connected. For example, communication interface 1670 may be a parallel port or a serial port or a universal serial bus (USB) port on a personal computer. In some embodiments, communications interface 1670 is an integrated services digital network (ISDN) card or a digital subscriber line (DSL) card or a telephone modem that provides an information communication connection to a corresponding type of telephone line. In some embodiments, a communication interface 1670 is a cable modem that converts signals on bus 1610 into signals for a communication connection over a coaxial cable or into optical signals for a communication connection over a fiber optic cable. As another example, communications interface 1670 may be a local area network (LAN) card to provide a data communication connection to a compatible LAN, such as Ethernet. Wireless links may also be implemented. For wireless links, the communications interface 1670 sends or receives, or both sends and receives electrical, acoustic or electromagnetic signals, including infrared and optical signals, that carry information streams, such as digital data. For example, in wireless handheld devices, such as mobile telephones like cell phones, the communications interface 1670 includes a radio band electromagnetic transmitter and receiver called a radio transceiver. In certain embodiments, the communications interface 1670 enables connection to the communication network 133 for providing a runaway vehicle detection system.

The term computer-readable medium is used herein to refer to any medium that participates in providing information to processor 1602, including instructions for execution. Such a medium may take many forms, including, but not limited to, non-volatile media, volatile media and transmission media. Non-volatile media include, for example, optical or magnetic disks, such as storage device 1608. Volatile media include, for example, dynamic memory 1604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1678 typically provides information communication using transmission media through one or more networks to other devices that use or process the information. For example, network link 1678 may provide a connection through local network 1680 to a host computer 1682 or to equipment 1684 operated by an Internet Service Provider (ISP). ISP equipment 1684 in turn provides data communication services through the public, world-wide packet-switching communication network of networks now commonly referred to as the Internet 1690.

A computer called a server host 1692 connected to the Internet hosts a process that provides a service in response to information received over the Internet. For example, server host 1692 hosts a process that provides information representing video data for presentation at display 1614. It is contemplated that the components of system can be deployed in various configurations within other computer systems, e.g., host 1682 and server 1692.

FIG. 17 illustrates a chip set 1700 upon which an embodiment of the invention may be implemented. Chip set 1700 is programmed to provide a runaway vehicle detection system as described herein and includes, for instance, the processor and memory components described with respect to FIG. 16 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1700 includes a communication mechanism such as a bus 1701 for passing information among the components of the chip set 1700. A processor 1703 has connectivity to the bus 1701 to execute instructions and process information stored in, for example, a memory 1705. The processor 1703 may include one or more processing cores with each core configured to perform independently. A multi-core processor enables multiprocessing within a single physical package. Examples of a multi-core processor include two, four, eight, or greater numbers of processing cores. Alternatively or in addition, the processor 1703 may include one or more microprocessors configured in tandem via the bus 1701 to enable independent execution of instructions, pipelining, and multithreading. The processor 1703 may also be accompanied with one or more specialized components to perform certain processing functions and tasks such as one or more digital signal processors (DSP) 1707, or one or more application-specific integrated circuits (ASIC) 1709. A DSP 1707 typically is configured to process real-world signals (e.g., sound) in real time independently of the processor 1703. Similarly, an ASIC 1709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1703 and accompanying components have connectivity to the memory 1705 via the bus 1701. The memory 1705 includes both dynamic memory (e.g., RAM, magnetic disk, writable optical disk, etc.) and static memory (e.g., ROM, CD-ROM, etc.) for storing executable instructions that when executed perform the inventive steps described herein to provide a runaway vehicle detection system. The memory 1705 also stores the data associated with or generated by the execution of the inventive steps.

Figure 18:
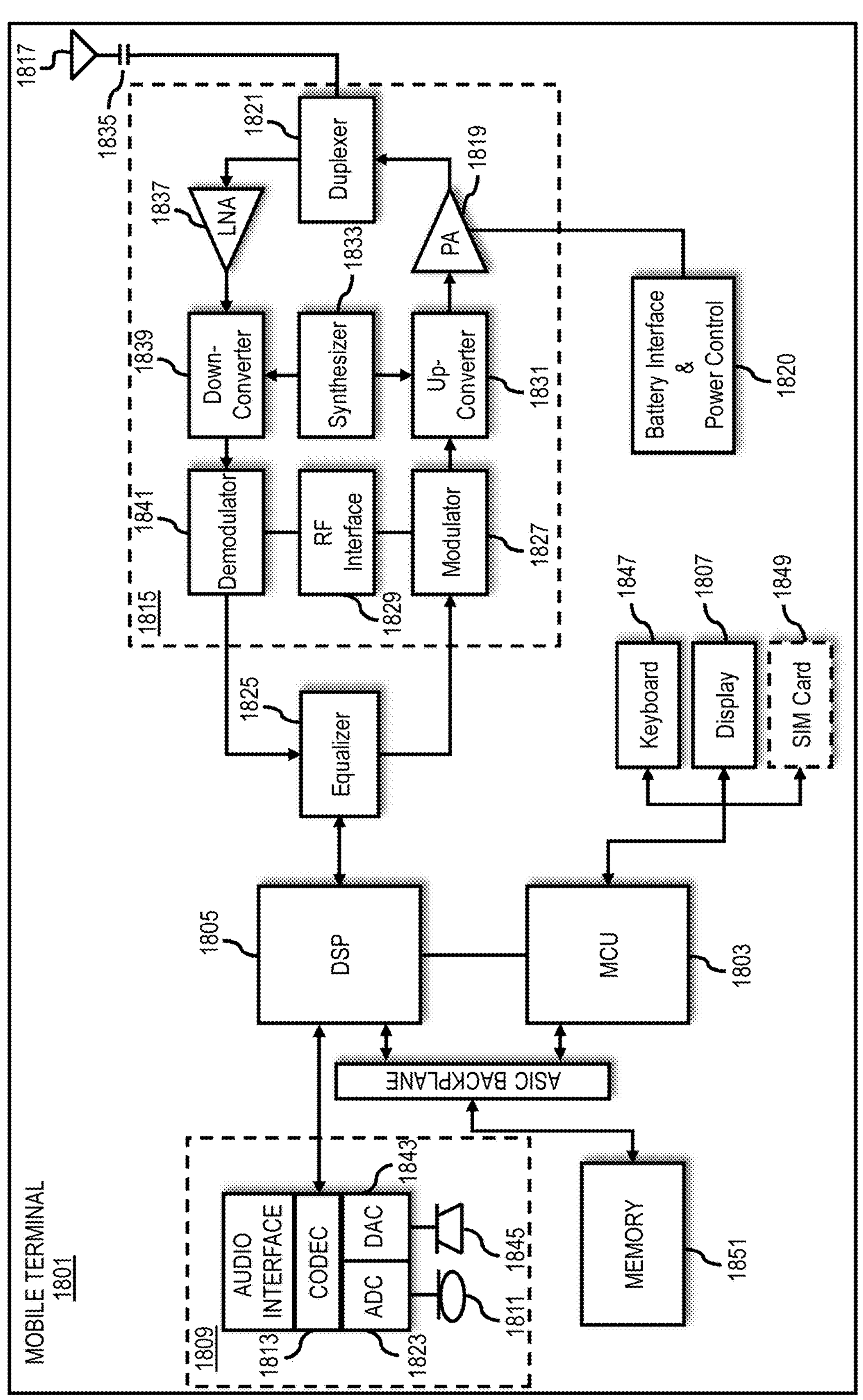
FIG. 18 is a diagram of a mobile terminal (e.g., handset or vehicle or part thereof) that can be used to implement an embodiment.

FIG. 18 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1803, a Digital Signal Processor (DSP) 1805, and a receiver/transmitter unit including a microphone gain control unit and a speaker gain control unit. A main display unit 1807 provides a display to the user in support of various applications and mobile station functions that offer automatic contact matching. An audio function circuitry 1809 includes a microphone 1811 and microphone amplifier that amplifies the speech signal output from the microphone 1811. The amplified speech signal output from the microphone 1811 is fed to a coder/decoder (CODEC) 1813.

A radio section 1815 amplifies power and converts frequency in order to communicate with a base station, which is included in a mobile communication system, via antenna 1817. The power amplifier (PA) 1819 and the transmitter/modulation circuitry are operationally responsive to the MCU 1803, with an output from the PA 1819 coupled to the duplexer 1821 or circulator or antenna switch, as known in the art. The PA 1819 also couples to a battery interface and power control unit 1820.

In use, a user of mobile station 1801 speaks into the microphone 1811 and his or her voice along with any detected background noise is converted into an analog voltage. The analog voltage is then converted into a digital signal through the Analog to Digital Converter (ADC) 1823. The control unit 1803 routes the digital signal into the DSP 1805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1825 for compensation of any frequency-dependent impairments that occur during transmission though the air such as phase and amplitude distortion. After equalizing the bit stream, the modulator 1827 combines the signal with a RF signal generated in the RF interface 1829. The modulator 1827 generates a sine wave by way of frequency or phase modulation. In order to prepare the signal for transmission, an up-converter 1831 combines the sine wave output from the modulator 1827 with another sine wave generated by a synthesizer 1833 to achieve the desired frequency of transmission. The signal is then sent through a PA 1819 to increase the signal to an appropriate power level. In practical systems, the PA 1819 acts as a variable gain amplifier whose gain is controlled by the DSP 1805 from information received from a network base station. The signal is then filtered within the duplexer 1821 and optionally sent to an antenna coupler 1835 to match impedances to provide maximum power transfer. Finally, the signal is transmitted via antenna 1817 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1801 are received via antenna 1817 and immediately amplified by a low noise amplifier (LNA) 1837. A down-converter 1839 lowers the carrier frequency while the demodulator 1841 strips away the RF leaving only a digital bit stream. The signal then goes through the equalizer 1825 and is processed by the DSP 1805. A Digital to Analog Converter (DAC) 1843 converts the signal and the resulting output is transmitted to the user through the speaker 1845, all under control of a Main Control Unit (MCU) 1803—which can be implemented as a Central Processing Unit (CPU) (not shown).

The MCU 1803 receives various signals including input signals from the keyboard 1847. The keyboard 1847 and/or the MCU 1803 in combination with other user input components (e.g., the microphone 1811) comprise a user interface circuitry for managing user input. The MCU 1803 runs a user interface software to facilitate user control of at least some functions of the mobile station 1801 to provide a runaway vehicle detection system. The MCU 1803 also delivers a display command and a switch command to the display 1807 and to the speech output switching controller, respectively. Further, the MCU 1803 exchanges information with the DSP 1805 and can access an optionally incorporated SIM card 1849 and a memory 1851. In addition, the MCU 1803 executes various control functions required of the station. The DSP 1805 may, depending upon the implementation, perform any of a variety of conventional digital processing functions on the voice signals. Additionally, DSP 1805 determines the background noise level of the local environment from the signals detected by microphone 1811 and sets the gain of microphone 1811 to a level selected to compensate for the natural tendency of the user of the mobile station 1801.

The CODEC 1813 includes the ADC 1823 and DAC 1843. The memory 1851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1851 may be, but not limited to, a single memory, CD, DVD, ROM, RAM, EEPROM, optical storage, or any other non-volatile or non-transitory storage medium capable of storing digital data.

An optionally incorporated SIM card 1849 carries, for instance, important information, such as the cellular phone number, the carrier supplying service, subscription details, and security information. The SIM card 1849 serves primarily to identify the mobile station 1801 on a radio network. The card 1849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

processing sensor data to detect that a vehicle is involved in or predicted to be involved in a runaway vehicle event, wherein the runaway event indicates that a mechanical failure has caused the vehicle to lose an ability to control its speed as the vehicle operates on a road;

processing map data, the sensor data, or a combination thereof to determine a runaway vehicle safety location based on at least one attribute of the vehicle, wherein the processing of the map data, the sensor data, or a combination thereof comprises:

searching the map data, the sensor data, or a combination thereof for one or more candidate locations with one or more topographical features capable of slowing the vehicle; and selecting the runaway vehicle safety location from the one or more candidate locations based on minimizing damage to the vehicle, the vehicle runaway vehicle safety location, a passenger of the vehicle, or a combination thereof;

generating an alert message indicating the runaway vehicle safety location; and providing the alert message for display on a device associated with the vehicle.

2. The method of claim 1, further comprising:

generating navigation guidance data from a location of the vehicle to the runaway vehicle safety location; and providing the navigation guidance data as an output for presentation on the device.

3. The method of claim 1, further comprising:

mapping the runaway vehicle safety location, the runaway vehicle event, or a combination thereof to digital map of a geographic database.

4. The method of claim 3, wherein the runaway vehicle safety location is stored a data layer of the digital map.

5. The method of claim 1, wherein the one or more topographical features capable of slowing the vehicle includes an incline relative to the road on which the vehicle is operating, a ground material that is softer than a threshold value, or a combination thereof.

6. The method of claim 1, wherein the one or more topographical features include an open field, a large shoulder, an incline relative to a road on which the vehicle is traveling, a ground material that is softer than a threshold value, or a combination thereof.

7. The method of claim 1, wherein the runaway vehicle safety location is selected to avoid one or more points of interest (POIs) within a threshold proximity.

8. The method of claim 1, further comprising:

determining real-time or historical traffic data for a location of the vehicle, wherein the runaway vehicle safety location is determined based on the real-time or historical traffic data.

9. The method of claim 1, further comprising:

determining real-time or historical weather data for a location of the vehicle, wherein the runaway vehicle safety location is determined based on the real-time or historical weather data.

10. The method of claim 1, wherein the sensor data includes image data, sound data, or a combination thereof collected by one or more sensors of the vehicle, a passing vehicle, an infrastructure device, an aerial vehicle, or combination thereof.

11. The method of claim 1, wherein the processing of the map data, the sensor data, or a combination thereof to determine the runaway vehicle safety location comprises:

extracting an input feature set from the at least one attribute of the vehicle, at least one topographical attribute of a current location of the vehicle, or a combination thereof;

providing the input feature set to a machine learning system that is trained to predict the runaway vehicle safety location.

12. The method of claim 1, further comprising:

transmitting the alert message to another vehicle within a threshold proximity of the vehicle.

13. The method of claim 12, wherein the another vehicle activates one or more automated driving controls in response to the alert message to evade the vehicle, the runaway vehicle safety location, or a combination thereof.

14. The method of claim 12, further comprising:

activating one or more automated driving controls of the vehicle in response to the alert message.

15. The method of claim 1, wherein the at least one attribute includes a vehicle type, a vehicle speed, a vehicle size, a vehicle weight, a vehicle cargo, or a combination thereof.

16. The method of claim 1, wherein the runaway vehicle safety location includes a dedicated runaway vehicle safety location, an ad-hoc runaway vehicle safety location, or a combination thereof.

17. An apparatus comprising:

at least one processor; and at least one memory including computer program code for one or more programs, the at least one memory and the computer program code configured to, with the at least one processor, cause the apparatus to perform at least the following, process sensor data to detect that a vehicle is involved in or predicted to be involved in a runaway vehicle event, wherein the runaway event indicates that a mechanical failure has caused the vehicle to lose an ability to control its speed as the vehicle operates on a road;

process map data, the sensor data, or a combination thereof to determine a runaway vehicle safety location based on at least one attribute of the vehicle, wherein the processing of the map data, the sensor data, or a combination thereof comprises:

searching the map data, the sensor data, or a combination thereof for one or more candidate locations with one or more topographical features capable of slowing the vehicle; and selecting the runaway vehicle safety location from the one or more candidate locations based on minimizing damage to the vehicle, the vehicle runaway vehicle safety location, a passenger of the vehicle, or a combination thereof;

generate an alert message indicating the runaway vehicle safety location; and provide the alert message for display on a device associated with the vehicle.

18. The apparatus of claim 17, wherein the apparatus is further caused to:

map the runaway vehicle safety location, the runaway vehicle event, or a combination thereof to digital map of a geographic database.

19. A non-transitory computer-readable storage medium, carrying one or more sequences of one or more instructions which, when executed by one or more processors, cause an apparatus to perform:

processing sensor data to detect that a vehicle is involved in or predicted to be involved in a runaway vehicle event, wherein the runaway event indicates that a mechanical failure has caused the vehicle to lose an ability to control its speed as the vehicle operates on a road;

processing map data, the sensor data, or a combination thereof to determine a runaway vehicle;

processing map data, the sensor data, or a combination thereof to determine a runaway vehicle safety location based on at least one attribute of the vehicle, wherein the processing of the map data, the sensor data, or a combination thereof comprises:

searching the map data, the sensor data, or a combination thereof for one or more candidate locations with one or more topographical features capable of slowing the vehicle; and selecting the runaway vehicle safety location from the one or more candidate locations based on minimizing damage to the vehicle, the vehicle runaway vehicle safety location, a passenger of the vehicle, or a combination thereof;

generating an alert message indicating the runaway vehicle safety location; and providing the alert message for display on a device associated with the vehicle.

20. The non-transitory computer-readable storage medium of claim 19, wherein the apparatus is caused to further perform:

mapping the runaway vehicle safety location, the runaway vehicle event, or a combination thereof to digital map of a geographic database.

* * * * *